US012393138B2

(12) United States Patent
Choi et al.

(10) Patent No.: US 12,393,138 B2
(45) Date of Patent: Aug. 19, 2025

(54) TONER REFILL CARTRIDGE HAVING STRUCTURE IN WHICH DRIVING FORCE IS TRANSMITTED THROUGH TONER OUTLET

(71) Applicant: Hewlett-Packard Development Company, L.P., Spring, TX (US)

(72) Inventors: Woongyong Choi, Gyeong-gi-do (KR); Yongnam Ahn, Gyeong-gi-do (KR); Junhui Kim, Gyeonggi-do (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/698,722

(22) PCT Filed: Mar. 15, 2022

(86) PCT No.: PCT/US2022/071148

§ 371 (c)(1),
(2) Date: Apr. 4, 2024

(87) PCT Pub. No.: WO2023/064645

PCT Pub. Date: Apr. 20, 2023

(65) Prior Publication Data

US 2025/0237975 A1 Jul. 24, 2025

(30) Foreign Application Priority Data

Oct. 15, 2021 (KR) ........................ 10-2021-0137698

(51) Int. Cl.

*G03G 15/08* (2006.01)
*G03G 21/16* (2006.01)

(52) U.S. Cl.

CPC ..... *G03G 15/0886* (2013.01); *G03G 15/0867* (2013.01); *G03G 15/0889* (2013.01);

(Continued)

(58) Field of Classification Search

CPC ........... G03G 15/0867; G03G 15/0886; G03G 15/0889; G03G 21/1647; G03G 21/1676;

(Continued)

(56) References Cited

U.S. PATENT DOCUMENTS

2010/0150605 A1 6/2010 Yomoda et al.
2021/0232064 A1* 7/2021 Cho .................. G03G 15/0867

FOREIGN PATENT DOCUMENTS

EP 2856265 A1 4/2015
JP 2003-029519 A 1/2003

(Continued)

*Primary Examiner* — Sophia S Chen
(74) *Attorney, Agent, or Firm* — Foley & Lardner LLP

(57) ABSTRACT

A toner cartridge includes: a body to contain toner and including a toner outlet to discharge the toner to the outside; an agitating member to rotate about a central axis of the body and agitate the toner contained in the body; a shutter member to move along the central axis with respect to the body, and having an open position to open the toner outlet and a blocked position to block the toner outlet; a driving force receiver exposed to the outside through the toner outlet when the shutter member is in the blocked position, and to rotate by receiving a driving force from the outside; and a driving shaft to transmit a rotational force of the driving force receiver to the agitating member.

15 Claims, 28 Drawing Sheets

(52) U.S. Cl.
CPC ..... *G03G 21/1647* (2013.01); *G03G 21/1676* (2013.01); *G03G 2215/0673* (2013.01); *G03G 2215/0678* (2013.01); *G03G 2221/1657* (2013.01)

(58) Field of Classification Search
CPC ... G03G 2215/0673; G03G 2215/0678; G03G 2221/1657
See application file for complete search history.

(56) References Cited

FOREIGN PATENT DOCUMENTS

| | | | |
|---|---|---|---|
| JP | 2014-013372 | A | 1/2014 |
| WO | 2013/183782 | A1 | 12/2013 |
| WO | 2021/061188 | A1 | 4/2021 |

* cited by examiner

TONER REFILL CARTRIDGE HAVING STRUCTURE IN WHICH DRIVING FORCE IS TRANSMITTED THROUGH TONER OUTLET

CROSS-REFERENCE TO RELATED APPLICATIONS

This application is a National Stage Application under 35 U.S.C. § 371 of PCT/US2022/071148, filed Mar. 15, 2022, which claims priority to Korean Patent Application No. 10-2021-0137698, filed Oct. 15, 2021, which are hereby incorporated by reference in their entireties.

BACKGROUND

An electro-photographic image forming apparatus forms a visible toner image on a photoconductor by supplying a toner to an electrostatic latent image formed on the photoconductor, transfers the toner image onto a printing medium via an intermediate transfer medium or directly, and then fuses the transferred toner image onto the printing medium.

A developing cartridge contains the toner, and supplies the toner to the electrostatic latent image formed on the photoconductor to form the visible toner image. In a case where the toner contained in the developing cartridge is exhausted, the developing cartridge is removed from a main body of the image forming apparatus, and a new developing cartridge may be installed in the main body. New toner may be filled or refilled in the developing cartridge by using a toner refilling kit (toner refilling cartridge).

DETAILED DESCRIPTION

Figure 1:
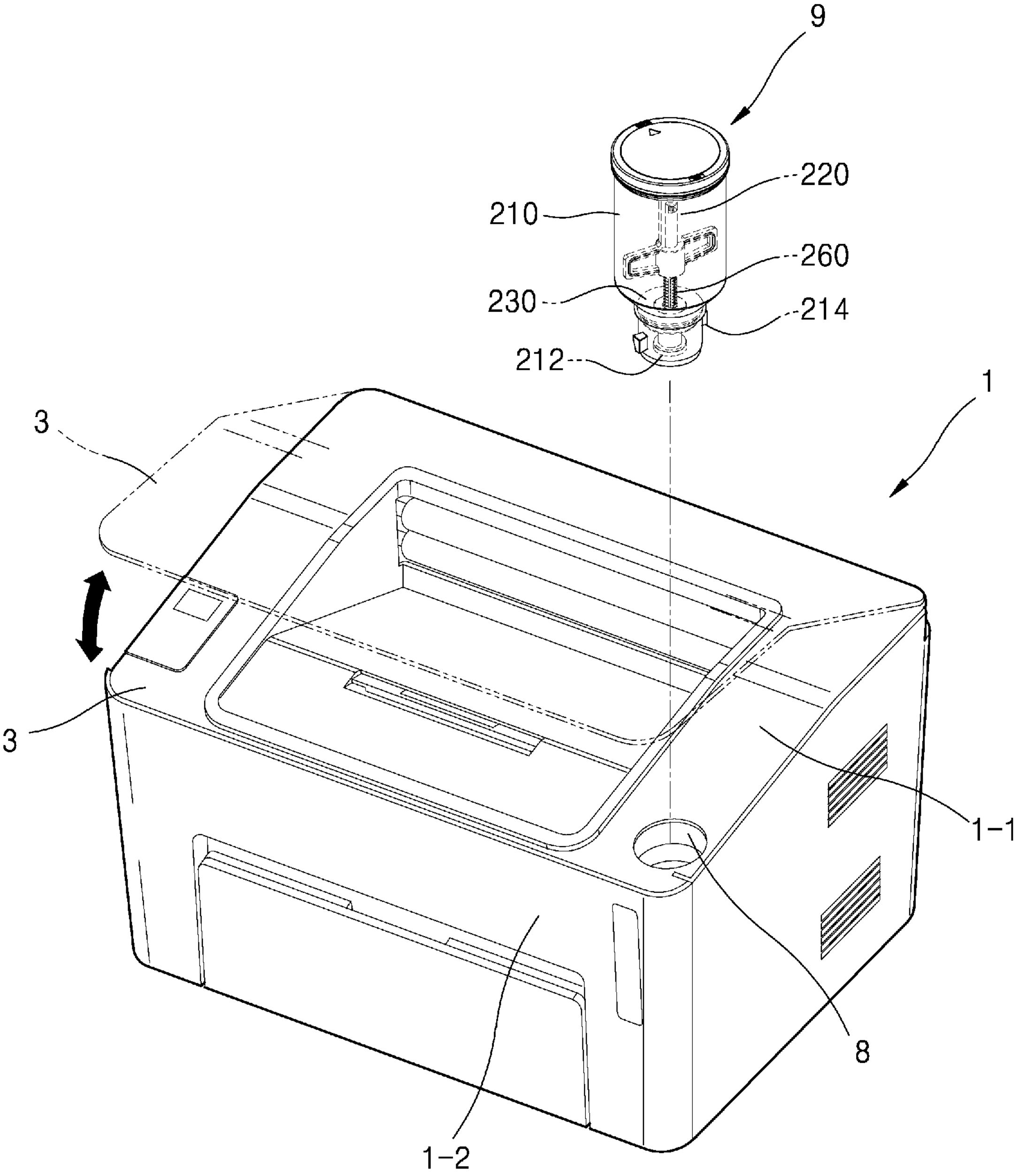
FIG. 1 is a schematic external perspective view of an electro-photographic image forming apparatus, according to an example.

In an example, a toner refilling cartridge is of a type in which a user directly presses the toner refilling cartridge to manually discharge the toner. In another example, a toner refilling cartridge is of a type in which the toner is automatically discharged by receiving a driving force from a main body of an image forming apparatus.

A toner refilling cartridge that discharges the toner based on manual user application of a physical force to inject the toner into an image forming apparatus may be inconvenient to use for a user. A toner refilling cartridge that automatically discharges the toner does not use physical force from a user to inject the toner, which may enhance user convenience.

However, a configuration of the toner refilling cartridge that automatically discharges the toner may have a complicated structure and increased size. For example, the toner refilling cartridge that automatically discharges the toner may include a driving force receiver to receive a driving force, and a separate connection opening, apart from a toner outlet, to expose the driving force receiver to the outside. Due to such a separate connection opening, a structure of one end portion of the toner refilling cartridge may be complicated and the size thereof may also increase.

A toner refilling cartridge according to the some examples has a structure in which a driving force is transmitted through a toner outlet, so that a structure of the toner refilling cartridge connected to a main body of an image forming apparatus may be simplified and the size thereof may be reduced. For example, the toner refilling cartridge may include a shutter member configured to move along a central axis with respect to the main body during an installing process, and a driving force receiver arranged inside the shutter member and exposed to the outside through the toner outlet. Therefore, in a process of installing the toner refilling cartridge, the driving force receiver may be naturally connected to a driving force transmitter of the main body through the toner outlet, and the shutter member may move along the central axis to be naturally opened.

The driving force transmitter of the main body may rotate along with a rotation conveying portion configured to convey the toner in the main body, and the driving force receiver of the toner refilling cartridge may rotate along with an agitating member configured to agitate the toner in the toner refilling cartridge. Therefore, in a case where the driving force transmitter and the driving force receiver rotate, the toner in the toner refilling cartridge is agitated by the agitating member to move in the gravitational direction, and, the toner in the main body is conveyed in the gravitational direction by the rotation conveying portion. Thus, the toner of the toner refilling cartridge may be quickly filled in the main body.

Hereinafter, the toner refilling cartridge and an example of an image forming apparatus including the toner refilling cartridge are described in detail with reference to the accompanying drawings. In the present specification and the drawings, constituent elements having substantially the same functions are referenced by the same reference numerals, and thus, redundant descriptions thereof are omitted.

Figure 2:
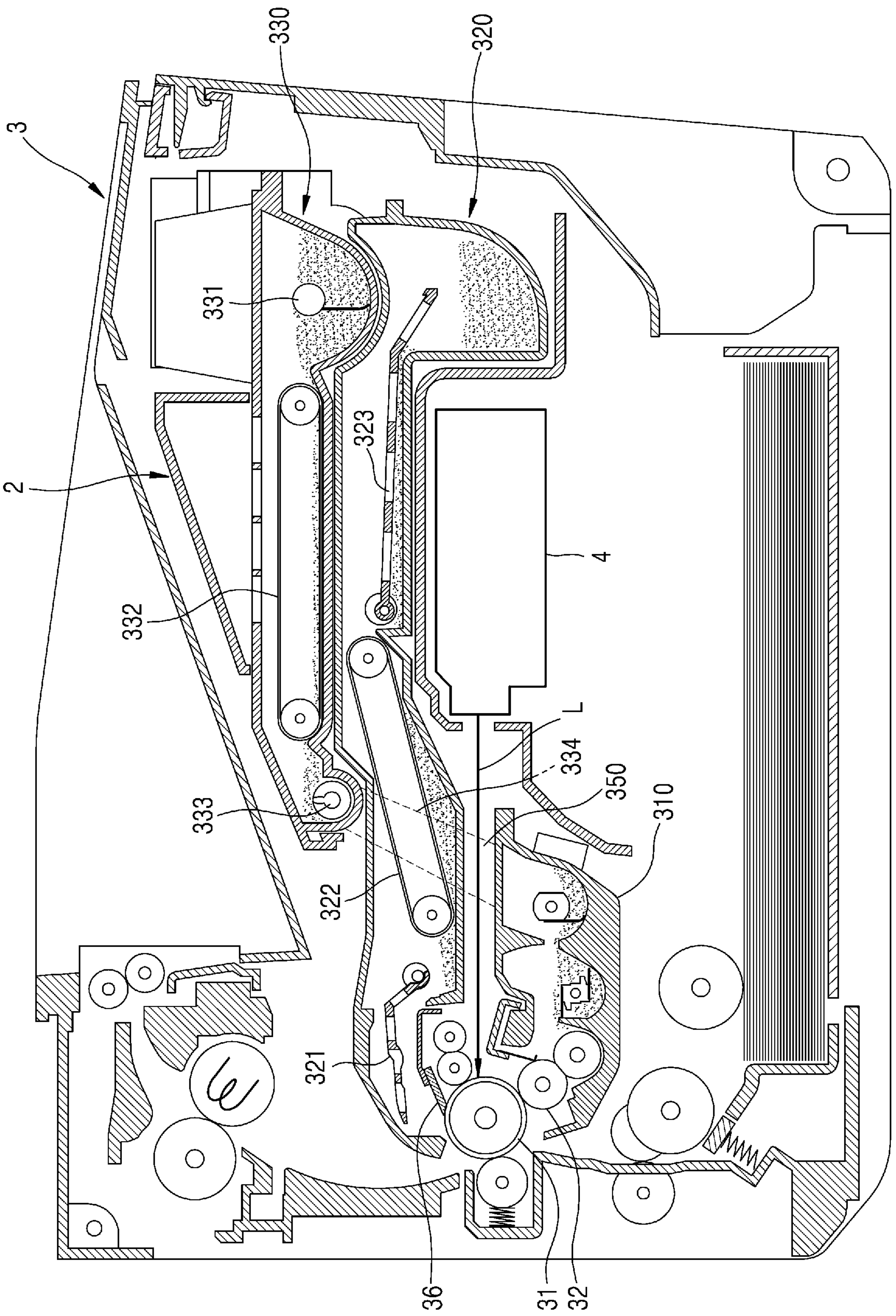
FIG. 2 is a schematic configuration diagram of the electro-photographic image forming apparatus shown in FIG. 1, according to an example.
Figure 3:
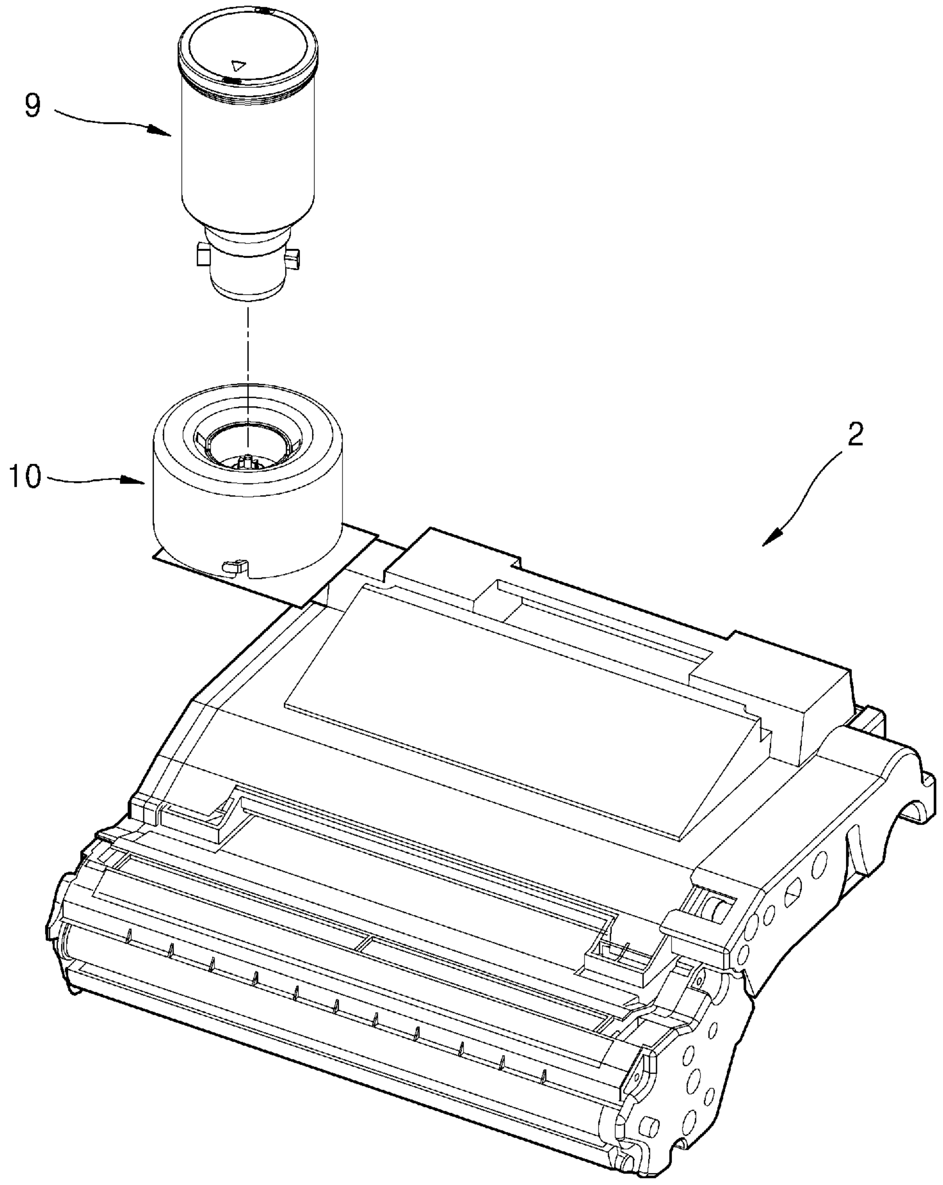
FIG. 3 is a perspective view of a developing cartridge employed in an example of the electro-photographic image forming apparatus shown in FIG. 1, according to an example.

FIG. 1 is a schematic external perspective view of an electro-photographic image forming apparatus, according to an example. FIG. 2 is a schematic configuration diagram of the electro-photographic image forming apparatus shown in FIG. 1, according to an example. FIG. 3 is a perspective view of a developing cartridge 2 employed in an example of the electro-photographic image forming apparatus shown in FIG. 1, according to an example. Referring to FIGS. 1, 2, and 3, an image forming apparatus may include a main body 1 and the developing cartridge 2 that is detachable from the main body 1. A door 3 may be provided in the main body 1. Although the door 3 configured to open an upper portion of the main body 1 is illustrated in FIG. 1, a door configured to open a side or all of the main body 1 may be employed. When the door 3 is opened, the developing cartridge 2 may be installed into or removed from the main body 1.

The developing cartridge 2 according to the some examples includes a developing portion 310 in which a photosensitive drum 31 and a developing roller 32 are installed, a waste toner container 320 in which a waste toner removed from the photosensitive drum 31 is contained, and a toner container 330 connected to the developing portion 310 and configured to contain the toner. In order to refill the toner container 330 with toner, a toner filling portion 10 provides an interface between a toner refilling cartridge 9 to be described later and the developing cartridge 2.

The waste toner container 320 is located above the developing portion 310, and an optical path 350 is formed between the waste toner container 320 and the developing portion 310. The waste toner removed from the photosensitive drum 31 by a cleaning member 36 is contained in the waste toner container 320. The waste toner is conveyed into the waste toner container 320 by one or more waste toner conveying members 321, 322, and 323.

The toner container 330 is connected to the toner filling portion 10 to contain the toner. The toner container 330 is connected to the developing portion 310 by a toner supplier 334 as shown by dotted lines in FIG. 2. The toner supplier 334 is located outside an effective width of an exposure light L so as not to interfere with the light L scanned in a main scanning direction by an optical scanner 4. One or more toner supply members 331, 332, 333 to supply toner to the developing portion 310 through the toner supplier 334 may be installed in the toner container 330. The toner supply member 333 may convey the toner in the main scanning direction and deliver the same to the toner supplier 334.

The developing cartridge 2 supplies the toner contained in the toner container 330 to an electrostatic latent image formed on the photosensitive drum 31 to form a visible toner image. The developing cartridge 2 is detachable from the main body 1. In the image forming apparatus according to the some examples, while the developing cartridge 2 is installed in the main body 1, and is not in the process of being removed from the main body 1, the developing cartridge 2 may be refilled with toner.

Referring to FIGS. 1 and 3, the toner refilling cartridge 9 contains toner and discharges the toner through a toner outlet 212. Although not shown, the toner refilling cartridge 9 may include a communication portion to communicate with the main body 1. The communication portion is electrically connected to the main body 1, in a case where the toner refilling cartridge 9 is installed in the toner filling portion 10. The communication portion may perform functions such as indicating whether the toner refilling cartridge 9 is installed in the toner filling portion 10, and perform information transmission of the toner refilling cartridge 9. The communication portion may include a customer replaceable unit monitor (CRUM).

A communicating portion 8 is provided in the main body 1 such that the developing cartridge 2 has access to the toner filling portion 10 from the outside of the main body 1, while being installed in the main body 1. For example, the communicating portion 8 may be provided on an upper surface 1-1 of the main body 1, which is close to a front surface 1-2. The toner filling portion 10 is located at a lower portion of the communicating portion 8. When the toner refilling cartridge 9 is inserted into the communicating portion 8 from an upper side of the main body 1, the toner refilling cartridge 9 may be connected to the toner filling portion 10 as shown in FIG. 3. That is, by moving the toner refilling cartridge 9 in the direction of gravity and inserting the same into the communicating portion 8, the toner refilling cartridge 9 and the toner filling portion 10 may be connected to each other. In that case, the toner stored in the toner refilling cartridge may be discharged and supplied to the toner container 330 of the developing cartridge 2 through the toner filling portion 10. The toner refilling cartridge 9 is removed from the communicating portion 8 after toner refilling.

Figure 4:
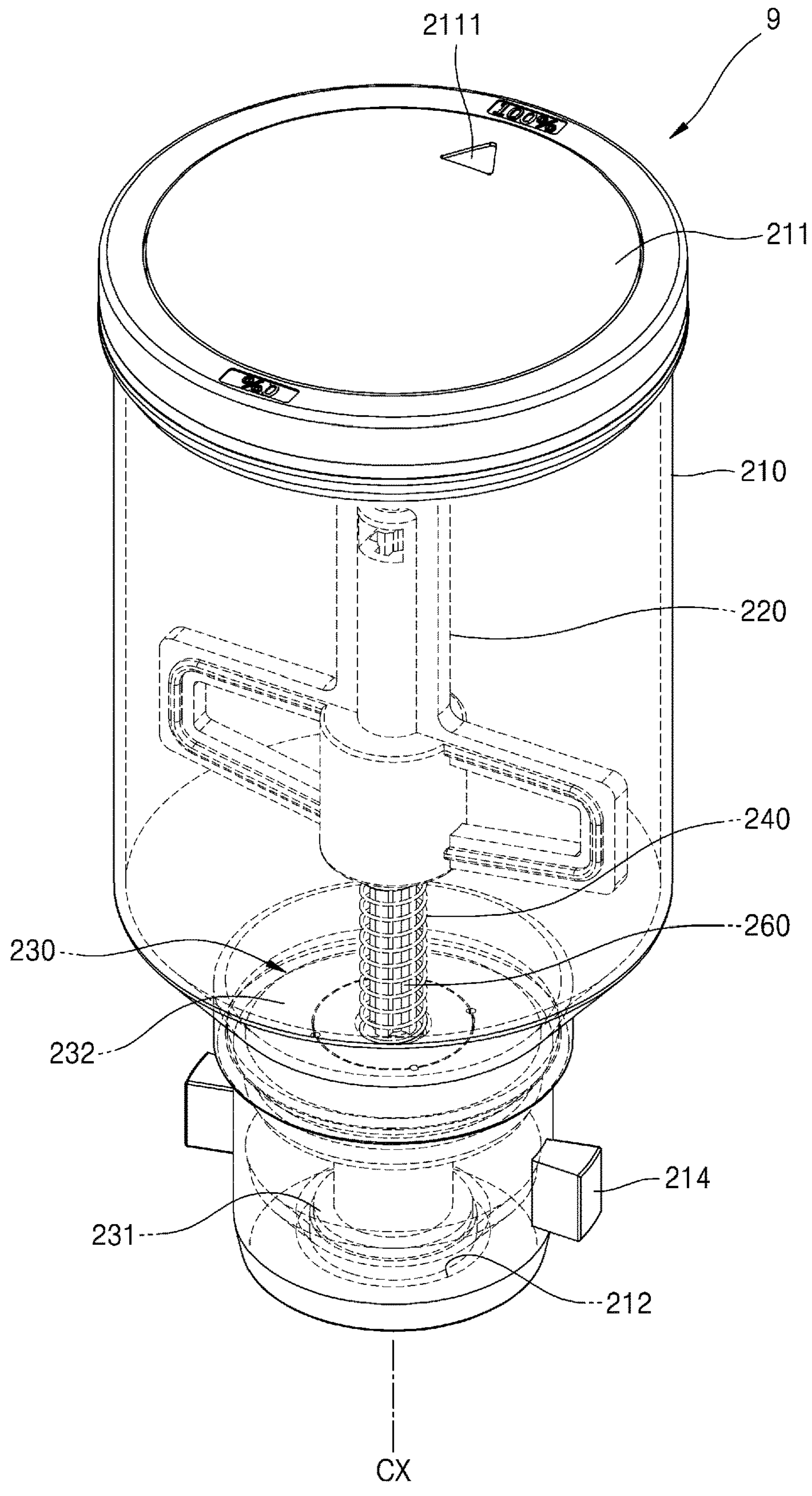
FIG. 4 is an assembled perspective view of a toner refilling cartridge, according to an example.
Figure 5:
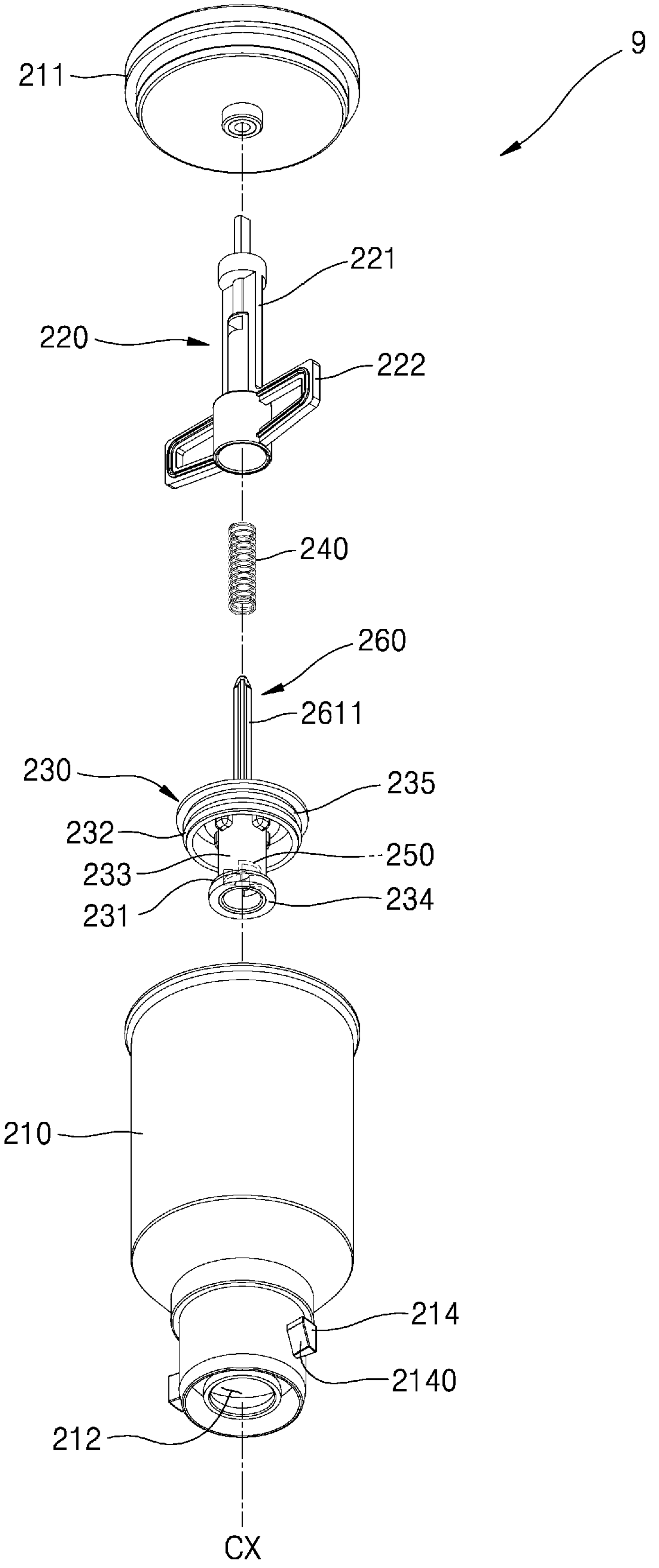
FIG. 5 is an exploded perspective view of a toner refilling cartridge, according to an example.
Figure 6:
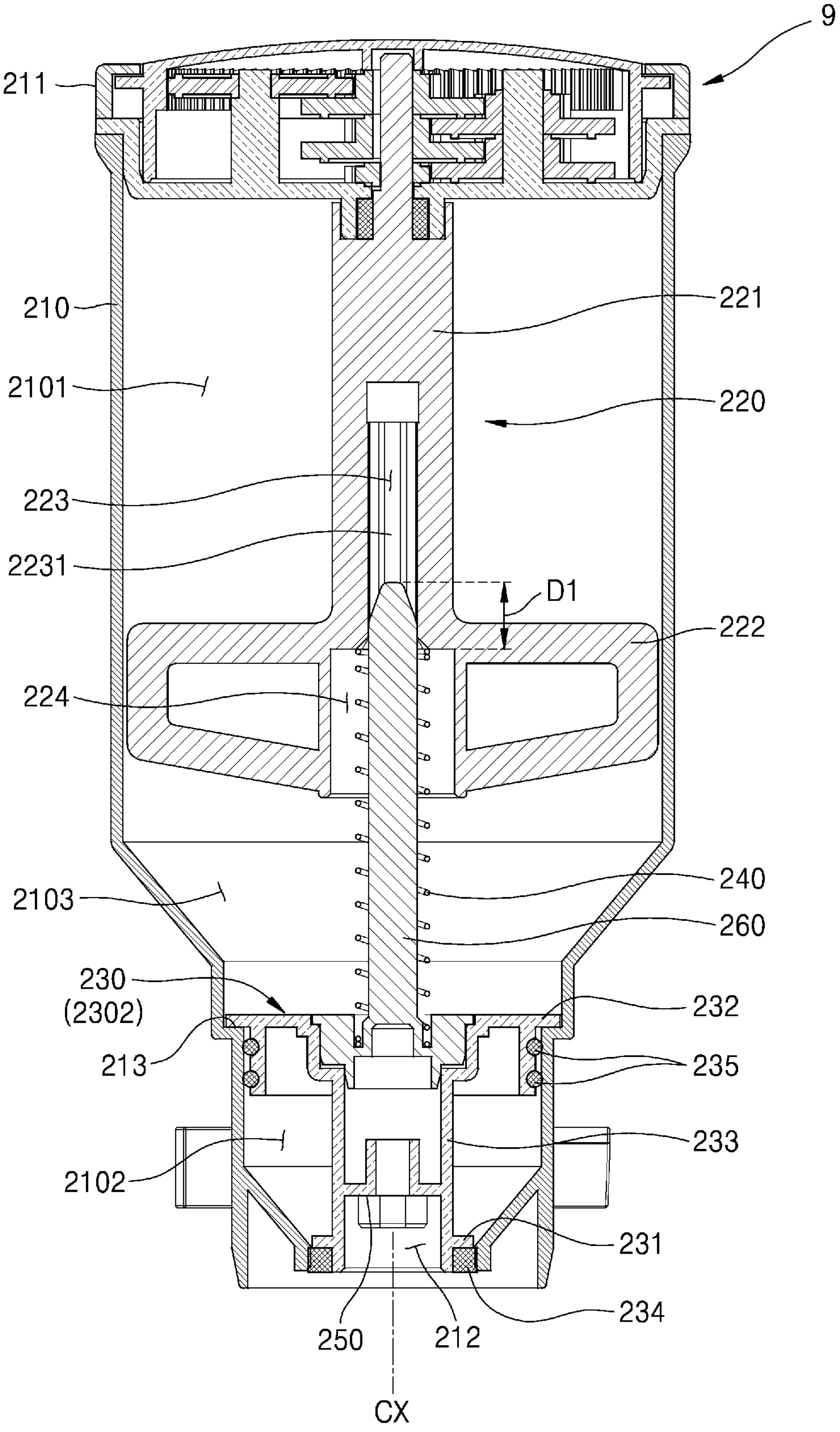
FIG. 6 is a cross-sectional view of the toner refilling cartridge of FIG. 4.
Figure 7:
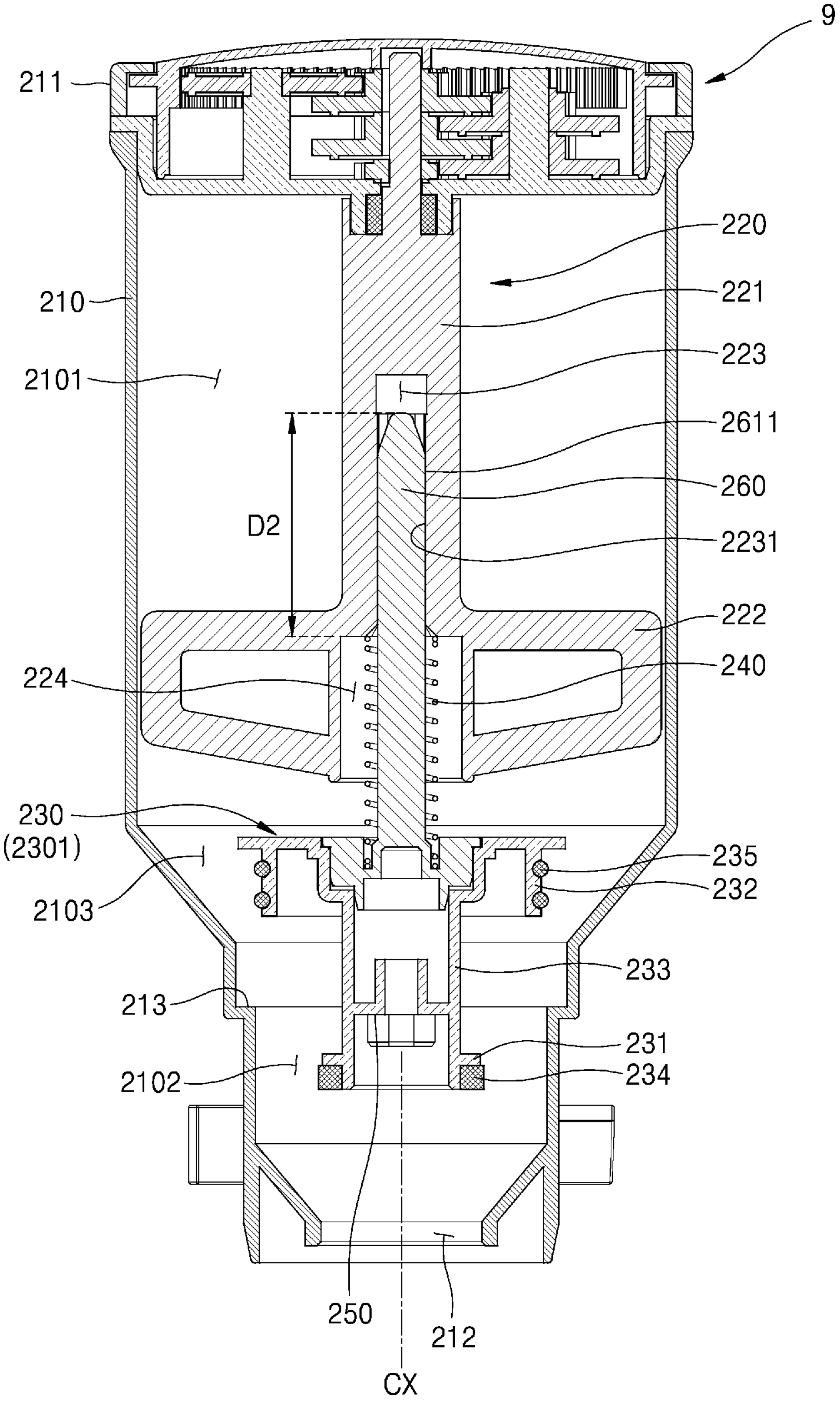
FIG. 7 is a cross-sectional view in a case where a shutter member in the toner refilling cartridge of FIG. 6 is in an open position.

FIG. 4 is an assembled perspective view of the toner refilling cartridge 9, according to an example, and FIG. 5 is an exploded perspective view of the toner refilling cartridge 9, according to an example. FIG. 6 is a cross-sectional view of the toner refilling cartridge 9 of FIG. 4, with a shutter member 230 in the toner refiling cartridge 9 in a blocked position 2302. FIG. 7 is a cross-sectional view of the toner refilling cartridge 9 with the shutter member 230 in an open position 2301.

Referring to FIGS. 4 to 6, the toner refilling cartridge 9 includes a body 210, an agitating member 220, the shutter member 230, a pressing member 240, a driving force receiver 250, and a driving shaft 260.

The body 210 forms the exterior of the toner refilling cartridge 9, contains toner therein, and includes the toner outlet 212 configured to discharge the contained toner to the outside. The agitating member 220, the shutter member 230, the pressing member 240, the driving force receiver 250, and the driving shaft 260 are arranged in the body 210.

The toner outlet 212 may be provided at one end portion of the body 210, and a lid 211 may be coupled to another end portion of the body 210. A status displayer 2111 may be arranged on the lid 211, and the status displayer 2111 is configured to indicate whether the toner is used up inside the toner refilling cartridge 9.

A plurality of coupling portions 214 are provided on an outer circumferential surface of the body 210. The plurality of coupling portions 214 protrude from the outer circumferential surface of the body 210. When the toner refilling cartridge 9 is inserted into the toner filling portion 10, the plurality of coupling portions 214 fix the toner refilling cartridge 9 to the toner filling portion 10 of an image forming apparatus, and prevent the toner refilling cartridge 9 from rotating in the toner filling portion 10.

The body 210 includes an accommodation space 2101 to contain the toner and a discharge space 2102 in which the toner outlet 212 is formed. A width of the discharge space 2102 may be less than a width of the accommodation space 2101. The width of the accommodation space 2101 may be greater than a rotation diameter of the agitating member 220, and the width of the discharge space 2102 may be less than the rotation diameter of the agitating member 220. A connection space 2103 is provided between the accommodation space 2101 and the discharge space 2102, and the connection space 2103 narrows in width as the connection space 2103 extends towards the discharge space 2102.

The agitating member 220 is arranged in the accommodation space 2101 and rotates to agitate the toner. The agitating member 220 may rotate about a central axis CX of the body 210. For example, one end portion of the agitating member 220 may be supported by the lid 211 to be rotatable. The agitating member 220 includes a rotation shaft 221 arranged on the central axis CX of the body 210 and an agitating blade 222 installed on the rotation shaft 221. While the agitating blade 222 rotates, the toner contained in the accommodation space 2101 is agitated. The agitated toner may have increased fluidity and move downwardly due to gravity.

The shutter member 230 may move along the central axis CX of the body 210. A direction of the central axis CX of the body 210 may be a longitudinal direction of the body 210 or an extension direction of the rotation shaft 221 of the agitating member 220, and may be parallel with the direction of gravity, when the toner refilling cartridge 9 is installed in the main body 1. The shutter member 230 has an open position 2301 to open the toner outlet 212 and a blocked position 2302 to block the toner outlet 212. The shutter member 230 moves between the open position 2301 and the blocked position 2302 along the central axis CX. The body 210 may have a step 213 to hold the shutter member 230 in the blocked position 2302. For example, the step 213 may be arranged in the discharge space 2102.

The pressing member 240 may press the shutter member 230 to move the shutter member 230 from the open position 2301 to the blocked position 2302 along the central axis CX. For example, the pressing member 240 provides an elastic force to press the shutter member 230 in a direction closer to the toner outlet 212. The shutter member 230 is pressed by the pressing member 240 to move until the shutter member 230 comes into contact with the step 213 of the body 210. In a state where no external force is applied to the toner refilling cartridge 9, the shutter member 230 may be held in the blocked position 2302 by the elastic force of the pressing member 240.

In a process of installing the toner refilling cartridge 9, in a case where an external force greater than the elastic force of the pressing member 240 is applied to the toner refilling cartridge 9 by a user, the shutter member 230 moves from the blocked position 2302 to the open position 2301 despite the elastic force of the pressing member 240. In a case where the external force applied to the toner refill cartridge 9 is released, the shutter member 230 moves from the open position 2301 to the blocked position 2302 by the elastic force of the pressing member 240, and the toner outlet 212 is blocked.

The shutter member 230 includes a first shutter 231 to block the toner outlet 212 and a second shutter 232 to block the inside of the discharge space 2102. The first shutter 231 has a first outer diameter corresponding to a width of the toner outlet 212, and the second shutter 232 has a second outer diameter corresponding to the width of the discharge space 2102. The first outer diameter may be less than the second outer diameter. The first shutter 231 and the second shutter 232 are connected to each other by a shutter connector 233. The first shutter 231, the shutter connector 233, and the second shutter 232 may be a single body. When the shutter member 230 moves, the first shutter 231, the shutter connector 233, and the second shutter 232 may move together.

In some examples, the second shutter 232 blocks the inside of the discharge space 2102. However, in other examples, the second shutter 232 may have a different arrangement. If the second shutter 232 blocks the inside of the body 210 apart from the toner outlet 212, a shape of the second shutter 232 may be modified. For example, the second shutter 232 may block a space between the accommodation space 2101 and the discharge space 2102, rather than the inside of the discharge space 2102. In other words, the second shutter 232 may block the connection space 2103 between the accommodation space 2101 and the discharge space 2102.

A first sealing member 234 may be arranged around the first shutter 231, and a second sealing member 235 may be arranged around the second shutter 232. When the shutter member 230 is in the blocked position 2302, the first sealing member 234 and the second sealing member 235 are pressed by an inner circumferential surface of the body 210, the first shutter 231 and the second shutter 232; as a result, the first sealing member 234 and the second sealing member 235 seal between the shutter member 230 and the body 210. When the shutter member 230 is in the open position 2301, the first and second sealing members 234 and 235 do not come into contact with the inner circumferential surface of the body 210; as a result, the toner may move between the first and second sealing members 234 and 235 and the body 210.

The driving force receiver 250 rotates by receiving a driving force from the outside. The driving force receiver 250 may be a driven coupler configured to receive a driving force from an image forming apparatus.

The driving force receiver 250 may be exposed to the outside through the toner outlet 212. For example, when the shutter member 230 is in the blocked position 2302, the driving force receiver 250 may be exposed to the outside through the toner outlet 212. As an example, the driving force receiver 250 may be arranged inside the shutter member 230. For example, the driving force receiver 250 may be provided inside the shutter connector 233. Even when the toner outlet 212 is blocked by the shutter member 230 in the blocked position 2302, the driving force receiver 250 inside the shutter member 230 may be exposed to the outside through the toner outlet 212.

As the driving force receiver 250 is exposed to the outside through the toner outlet 212, a separate opening does not have to employed to expose the driving force receiver 250 to the outside of the toner refilling cartridge 9. Thus, a connection structure of the toner refilling cartridge 9 and the toner filling portion 10 may be designed in a compact manner. In addition, as the driving force receiver 250 is arranged inside the shutter member 230, an additional space other than the shutter member 230 for the driving force receiver 250 does not have to be provided inside the body 210. Thus, it is possible to save space in the toner refilling cartridge 9 apart from the space to accommodate the toner.

The driving force receiver 250 transmits a rotational force to the agitating member 220 through the driving shaft 260. The driving shaft 260 transmits the rotational force of the driving force receiver 250 to the agitating member 220. For example, the driving shaft 260 may be fixed to the shutter member 230 and receive the rotational force of the driving force receiver 250 through the shutter member 230.

The driving shaft 260 may be configured to be movable in the direction of the central axis CX with respect to the agitating member 220. For example, the driving shaft 260 extends along the central axis CX, and a first end portion of the driving shaft 260 is inserted into the agitating member 220. The agitating member 220 includes a shaft groove 223 configured to receive the rotational force from the driving shaft 260, and the first end portion of the driving shaft 260 is inserted into the shaft groove 223. The first end portion of the driving shaft 260 and a cross-sectional shape of the shaft groove 223 may correspond to each other. In order to prevent relative rotation, any one of the first end portion of the driving shaft 260 and the shaft groove 223 may have a rotation prevention protrusion 2611, and the other one of the first end portion of the driving shaft 260 and the shaft groove 223 may have a rotation prevention groove 2231 into which the rotation prevention protrusion 2611 is inserted.

Referring to FIGS. 6 and 7, while the toner refilling cartridge 9 is installed, the shutter member 230 may move in the direction of the central axis CX with respect to the body 210. The shutter member 230 may move from the blocked position 2302 to the open position 2301. The agitating member 220 may rotate with respect to the body 210, but the agitating member 220 remains fixed in the central axis CX direction. Accordingly, when the shutter member 230 moves along the central axis CX, the driving shaft 260 fixed to the shutter member 230 moves along the central axis CX with respect to the agitating member 220. In other words, when the shutter member 230 moves from the blocked position 2302 to the open position 2301, the driving shaft 260 moves along the central axis CX. As the driving shaft 260 moves along the central axis CX, a depth at which the driving shaft 260 is inserted into the agitating member 220 varies. When the shutter member 230 moves along the central axis CX, a depth at which the driving shaft 260 is inserted into the shaft groove 223 varies. For example, while a depth at which the driving shaft 260 is inserted into the shaft groove 223 when the shutter member 230 is in the blocked position 2302 is a first depth D1, the depth at which the driving shaft 260 is inserted into the shaft groove 223 when the shutter member 230 is in the open position 2301 may be a second depth D2 greater the first depth D1.

The pressing member 240 may be an elastic member that surrounds a circumference of the driving shaft 260 and is compressible and expandable in the direction of the central axis CX. For example, the elastic member may be a coil spring. A first end portion of the pressing member 240 may be supported by the agitating member 220. For example, the first end portion of the pressing member 240 may be supported by a first support groove 224. The first support groove 224 may be arranged coaxially with the shaft groove 223, and a width of the first support groove 224 may be greater than a width of the shaft groove 223. A second end portion of the pressing member 240 may be supported by the shutter member 230. The shutter member 230 and the driving force receiver 250 are in a state in which a force is applied in a direction away from the agitating member 220 by the pressing member 240.

The shutter member 230 may be fixed to the driving force receiver 250. For example, the shutter member 230 and the driving force receiver 250 may be formed as a single body. While the toner refilling cartridge 9 is installed, the shutter member 230 and the driving force receiver 250 move relative to the body 210 in the direction of the central axis CX. When a rotational force from the outside is transmitted to the driving force receiver 250, the driving force receiver 250 and the shutter member 230 may rotate together. The driving shaft 260 may be fixed to the shutter member 230 and rotate together with the shutter member 230. Accordingly, the rotational force input to the driving force receiver 250 may be transmitted to the agitating member 220 through the shutter member 230 and the driving shaft 260, and may rotate such that the agitating member 220 agitates the toner.

Figure 8:
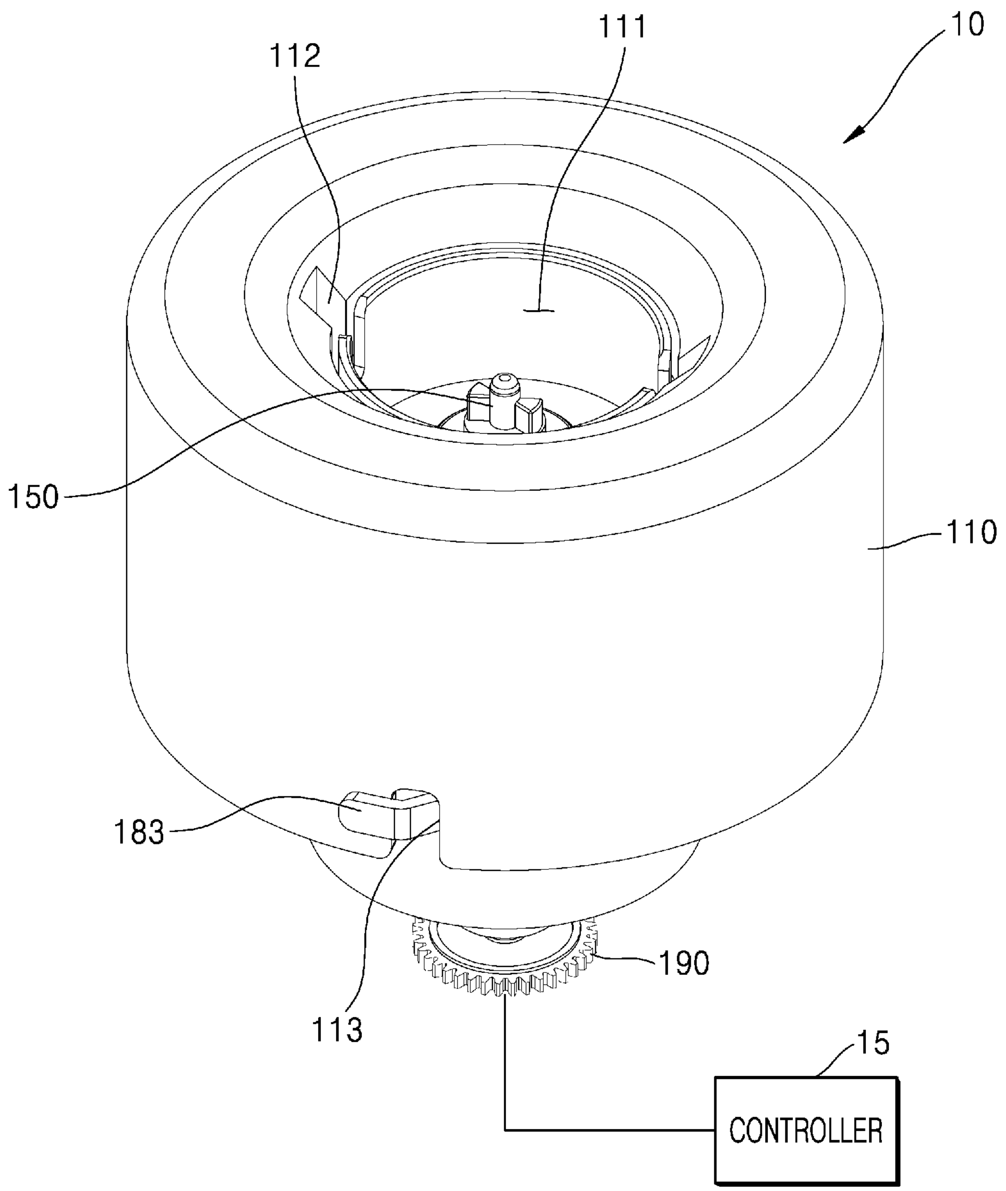
FIG. 8 is an assembled perspective view of a toner filling portion in which a toner refilling cartridge is installed, according to an example.
Figure 9:
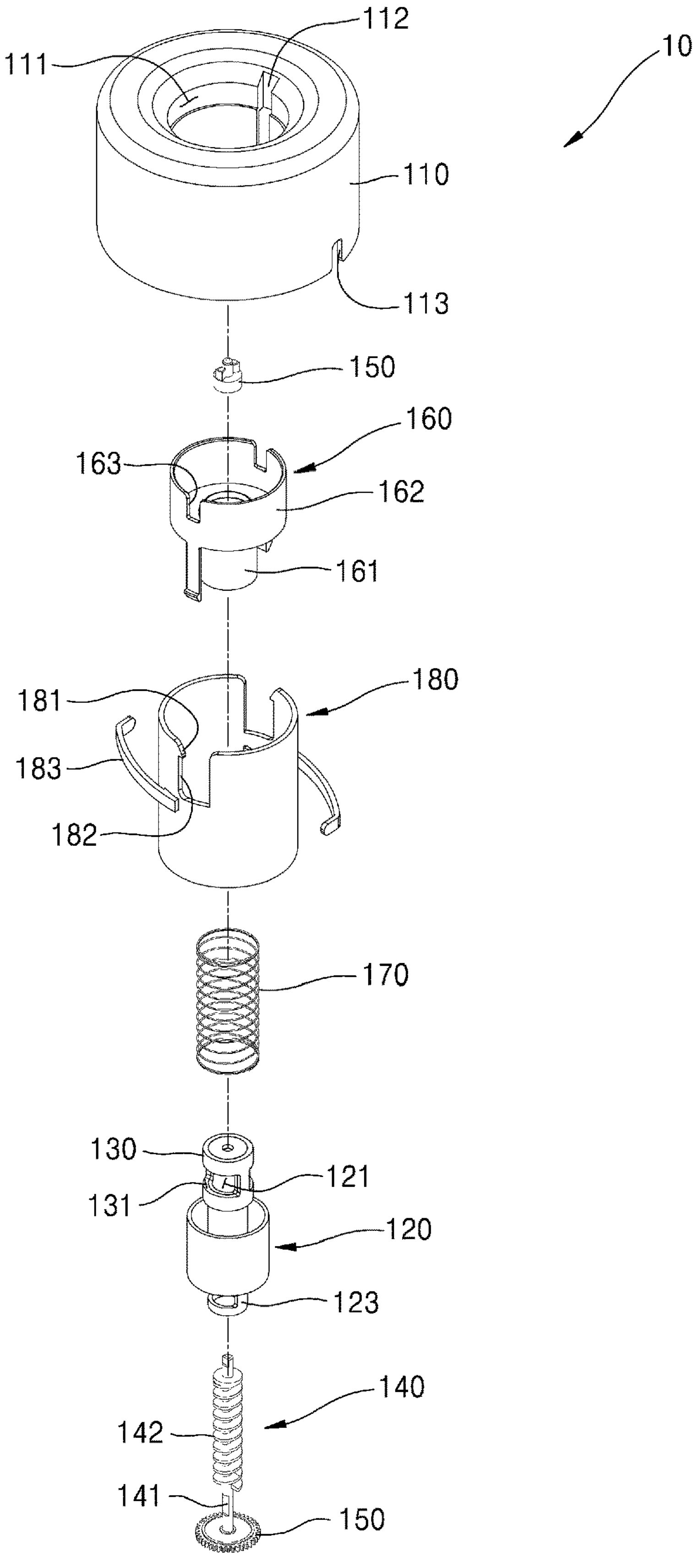
FIG. 9 is an exploded perspective view of the toner filling portion of FIG. 8, according to an example.
Figure 10:
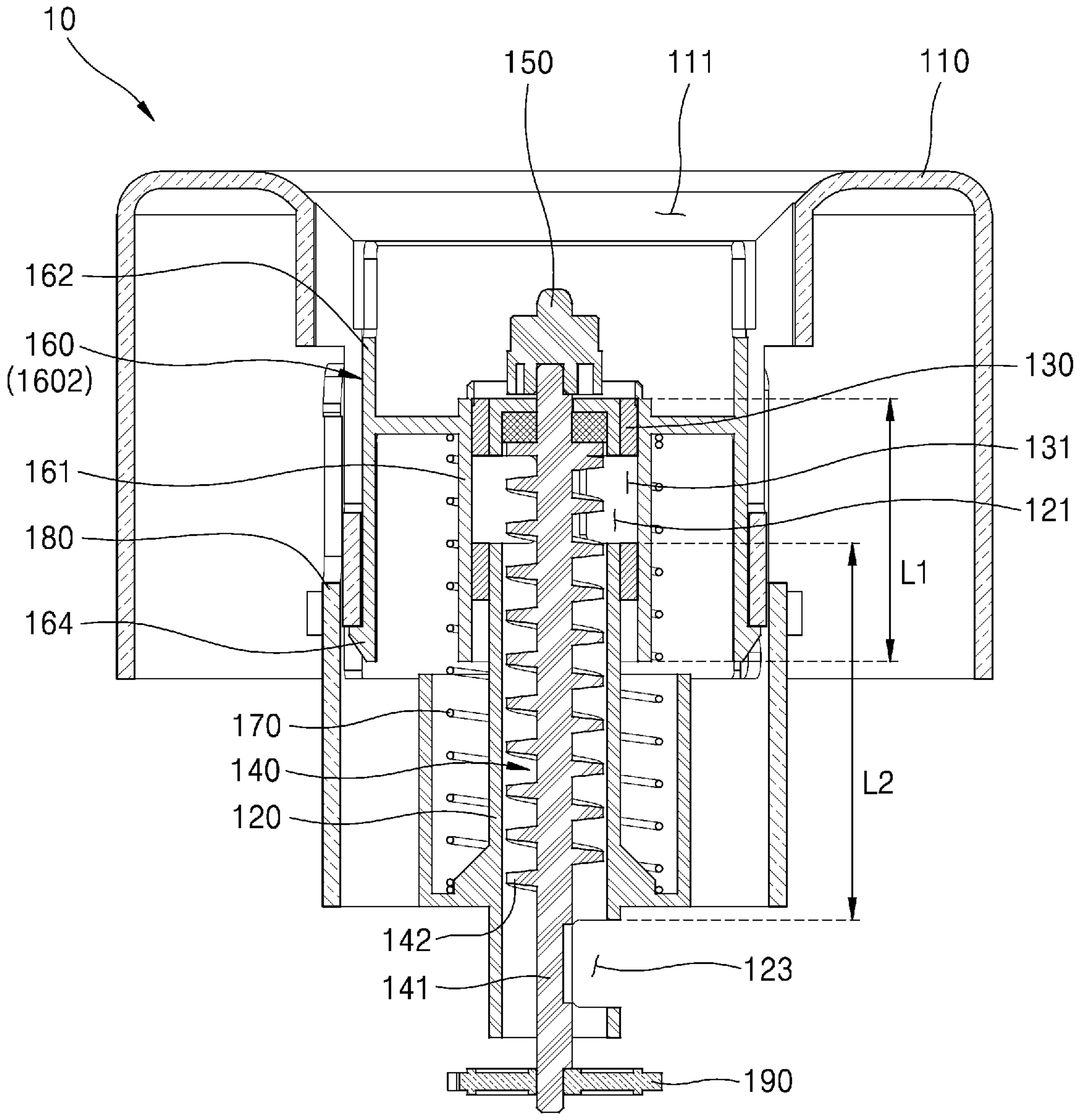
FIG. 10 is a cross-sectional view of the toner filling portion of FIG. 8.
Figure 11:
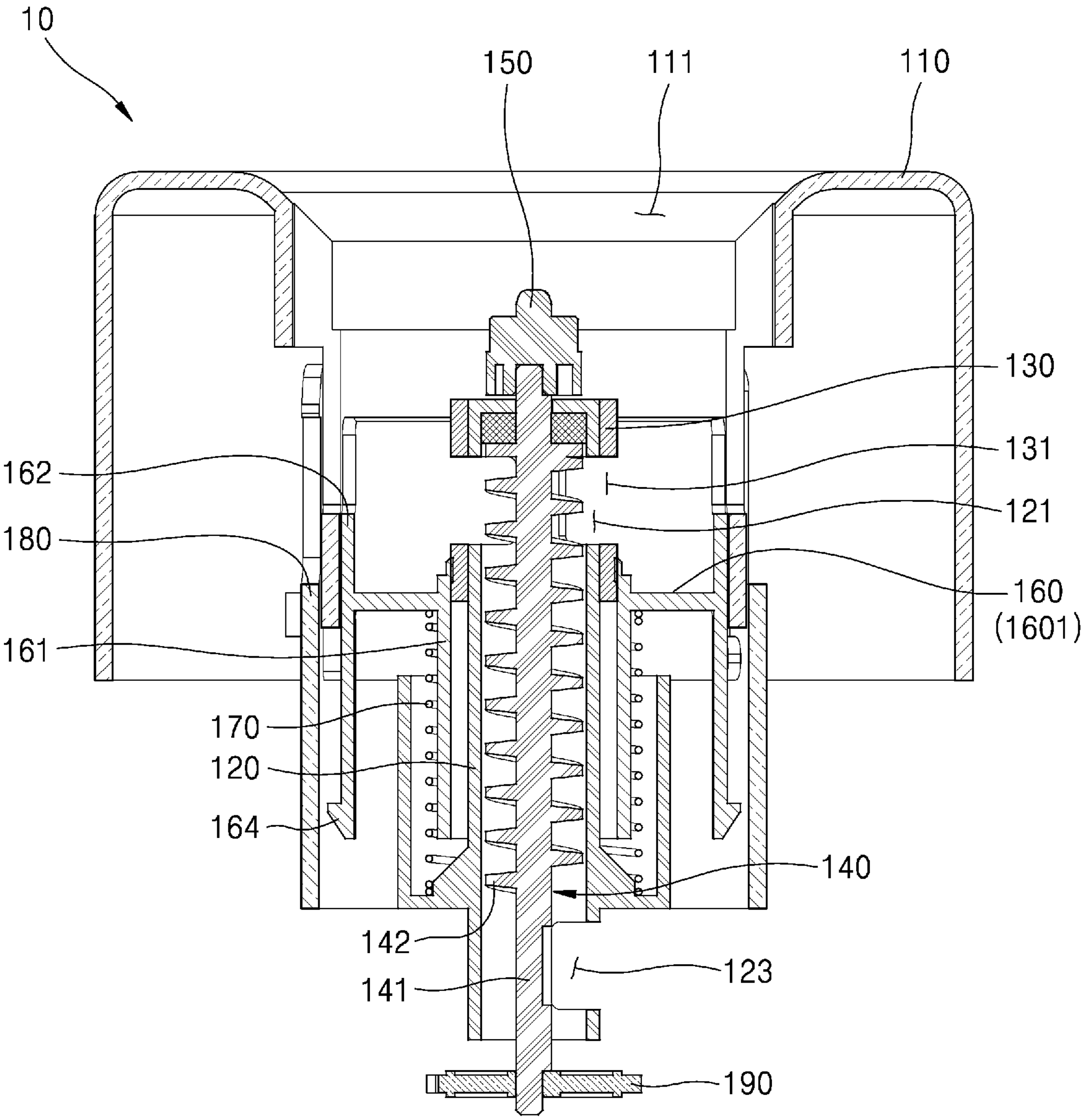
FIG. 11 is a cross-sectional view of a second shutter member of the toner filling portion of FIG. 10, in a second open position.

FIG. 8 is an assembled perspective view illustrating the toner filling portion 10 in which the toner refilling cartridge 9 is installed, according to an example, and FIG. 9 is an exploded view of the toner filling portion 10 of FIG. 8, according to an example. FIG. 10 is a cross-sectional view of the toner filling portion 10 of FIG. 8, with a second shutter member 160 of the toner filling portion 10 in a second blocked position 1602. FIG. 11 is a cross-sectional view of the toner filling portion 10 with the second shutter member 160 of FIG. 10 in a second open position 1601.

Referring to FIGS. 8 to 11, the toner filling portion 10 includes a filling cover 110, a toner conveying tube 120, a driving force transmitter 150, a rotation conveying portion 140, the second shutter member 160, and a second pressing member 170.

The filling cover 110 provides an insertion hole 111 into which the toner refilling cartridge 9 is inserted. The insertion hole 111 gradually decreases in width from top to bottom along the direction of gravity. Therefore, the toner refilling cartridge 9 may be easily inserted into the insertion hole 111 of the toner filling portion 10. In addition, the filling cover 110 protects the toner conveying tube 120, the driving force transmitter 150, the rotation conveying portion 140, the second shutter member 160, and the second pressing member 170 from protruding to the outside.

At least a portion of the toner conveying tube 120 is arranged in the insertion hole 111. The toner conveying tube 120 provides a conveying path through which toner is conveyed. For example, the toner conveying tube 120 has a cylindrical structure extending along the direction of gravity. A toner inlet 121 through which the toner is introduced is formed in the toner conveying tube 120. The toner inlet 121 is formed on an upper side of the toner conveying tube 120. Through the toner inlet 121, the toner may be introduced in a direction perpendicular to the direction of gravity. A third sealing member 130 is arranged around the toner inlet 121 in the toner conveying tube 120. An opening 131 is formed in the third sealing member 130 to allow the toner to flow into the toner inlet 121. Through the toner inlet 121 and the opening 131 of the third sealing member 130, the toner flows in a direction perpendicular to the direction of gravity. A toner outlet 123 through which the toner is discharged is formed at a lower portion of the toner conveying tube 120. The toner is delivered to the developing cartridge 2 of an image forming apparatus through the toner outlet 123.

The rotation conveying portion 140 is arranged in the toner conveying tube 120 to be rotatable. While the rotation conveying portion 140 rotates, the toner in the toner conveying tube 120 may be conveyed in the direction of gravity. For example, the rotation conveying portion 140 may include a spiral blade 142 arranged on the rotation shaft 141, and may be an auger that conveys the toner in the gravity direction by rotating. Because of the rotation conveying portion 140, the toner does not aggregate in the toner conveying tube 120, and may be conveyed rapidly in the direction of gravity.

The driving force transmitter 150 is arranged at one end portion of the toner conveying tube 120. The driving force transmitter 150 is arranged at an upper portion of the toner conveying tube 120. A rotation shaft of the driving force transmitter 150 is arranged coaxially with the rotation shaft 141 of the rotation conveying portion 140. The driving force transmitter 150 is connected to one end portion of the rotation conveying portion 140. Accordingly, in a case where the rotation conveying portion 140 rotates, a rotational force of the rotation conveying portion 140 is transmitted to the driving force transmitter 150 so that the driving force transmitter 150 rotates together. A rotation direction and rotation speed of the rotation conveying portion 140 may be the same as a rotation direction and rotation speed of the driving force transmitter 150.

The driving force transmitter 150 may be configured to be coupled to the driving force receiver 250 of the toner refilling cartridge 9. For example, the driving force transmitter 150 of the toner filling portion 10 and the driving force receiver 250 of the toner refilling cartridge 9 may be in the form of a coupler. The driving force receiver 250 and the driving force transmitter 150 include protrusions and grooves having shapes corresponding to each other. Accordingly, the driving force transmitter 150 is coupled to the driving force receiver 250, and a driving force of the driving force transmitter 150 is transmitted to the driving force receiver 250. A rotational force of the rotation conveying portion 140 may be transmitted to the driving force transmitter 150 to rotate the driving force receiver 250 of the toner refilling cartridge 9.

At least a portion of the second shutter member 160 is arranged in the insertion hole 111 and movable in the direction of gravity or a direction opposite to the direction of gravity. The second shutter member 160 may have a second blocked position 1602 to block the toner inlet 121 and the second open position 1601 to open the toner inlet 121. When the toner refilling cartridge 9 is installed in the toner filling portion 10, the second shutter member 160 is pressed in the gravity direction by the body 210 of the toner refilling cartridge 9 to move from the second blocked position 1602 to the second open position 1601. For example, the second shutter member 160 may be pressed by at least one of one end portion of the body 210 and the coupling portion 214 to move to the second open position 1601.

The second shutter member 160 includes a shutter region 161 to surround a circumference of the toner conveying tube 120 and a contact region 162 in contact with the body 210 and pressed against the body 210. A length L1 of the shutter region 161 in the gravitational direction may be less than a length L2 between the toner inlet 121 and the toner outlet 123 in the gravitational direction. The contact region 162 may include a first groove 163 into which the coupling portion 214 is inserted.

The second pressing member 170 presses the second shutter member 160 to move the second shutter member 160 from the second open position 1601 to the second blocked position 1602. For example, the second pressing member 170 may provide an elastic force to press the second shutter member 160 upward, opposite to the direction of gravity. When an external force applied while installing the toner refilling cartridge 9 is released, the second pressing member 170 may press the second shutter member 160 upward with an elastic force to move the second shutter member 160 from the second open position 1601 to the second blocked position 1602. Accordingly, when the toner refilling cartridge 9 is separated from the toner filling portion 10, the toner inlet 121 is blocked by the second shutter member 160. The second shutter member 160 includes a locking protrusion 164 to maintain the second blocked position 1602 and not to fall out of the toner filling portion 10.

A driving force supplier 190 to supply a rotational force is arranged at another end portion of the rotation conveying portion 140. The driving force supplier 190 transmits the rotational force to the driving force transmitter 150 through the rotation conveying portion 140. The rotational force transmitted to the driving force transmitter 150 may be transmitted to the toner refilling cartridge 9 to rotate the agitating member 220. Accordingly, the rotation conveying portion 140 of the toner filling portion 10 and the agitating member 220 of the toner refilling cartridge 9 may be rotated together by the single driving force supplier 190.

A controller 15 controls rotation of the driving force supplier 190. When the toner refilling cartridge 9 is installed in the toner filling portion 10, the controller 15 may rotate the driving force supplier 190. For example, if the toner refilling cartridge 9 is electrically connected to the image forming apparatus by a communication portion, when the toner refilling cartridge 9 is installed in the toner filling portion 10, the controller 15 may determine that the toner refilling cartridge 9 has been installed, and may accordingly rotate the driving force supplier 190. As the driving force supplier 190 is automatically rotated by the controller 15, the toner contained in the toner refilling cartridge 9 may be automatically supplied to the image forming apparatus.

The toner filling portion 10 further includes a fixing portion 180 to fix a location of the toner refilling cartridge 9. The fixing portion 180 includes a second groove 182 into which the coupling portion 214 of the toner refilling cartridge 9 may be inserted, and a locking protrusion 181 in the second groove 182 to limit movement of the coupling portion 214. The locking protrusion 181 may have an inclined surface 1810 (FIG. 14A) inclined in the direction of gravity. A force in the direction of gravity may be converted into a force in a direction perpendicular to the direction of gravity by the coupling portion 214 through the inclined surface 1810, and accordingly, the fixing portion 180 may rotate during an installing process of the toner refilling cartridge 9. However, the inclined surface 1810 may be omitted in other examples.

While rotating during the installing process of the toner refilling cartridge 9, the fixing portion 180 may have resilience to restore itself back to its original location. As an example, the fixing portion 180 may include a fixed blade 183 on an outer circumferential surface. The fixed blade 183 may have a helical structure capable of elastic deformation, and may be supported by a blade support groove 113 of the filling cover 110.

Hereinafter, a process in which the toner refilling cartridge 9 is installed in the image forming apparatus, a process in which toner is supplied by the toner refilling cartridge 9, and a process in which the toner refilling cartridge 9 is separated from the image forming apparatus are described.

Figure 12A:
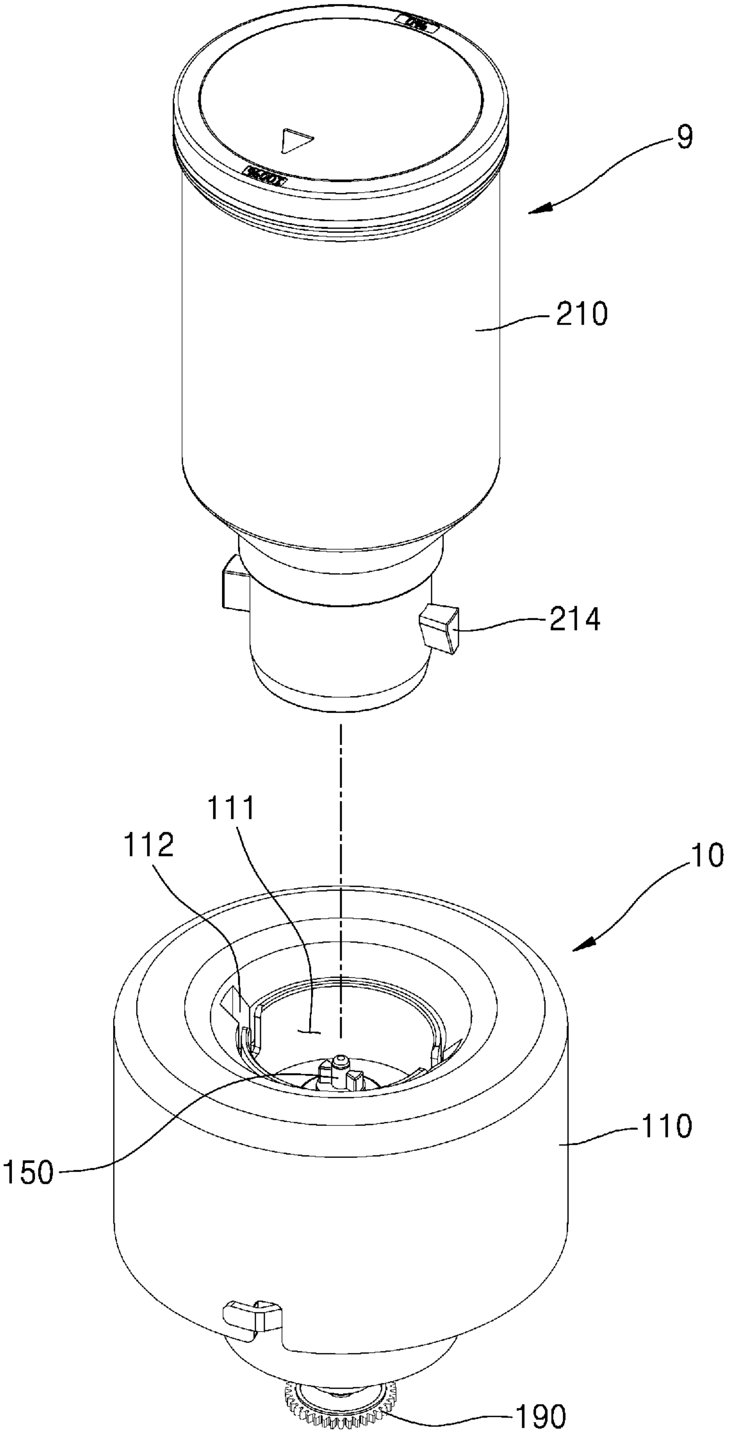
FIGS. 12A to 12C are perspective views illustrating a process in which a toner refilling cartridge is installed in a toner filling portion of an image forming apparatus, according to an example.
Figure 12B:
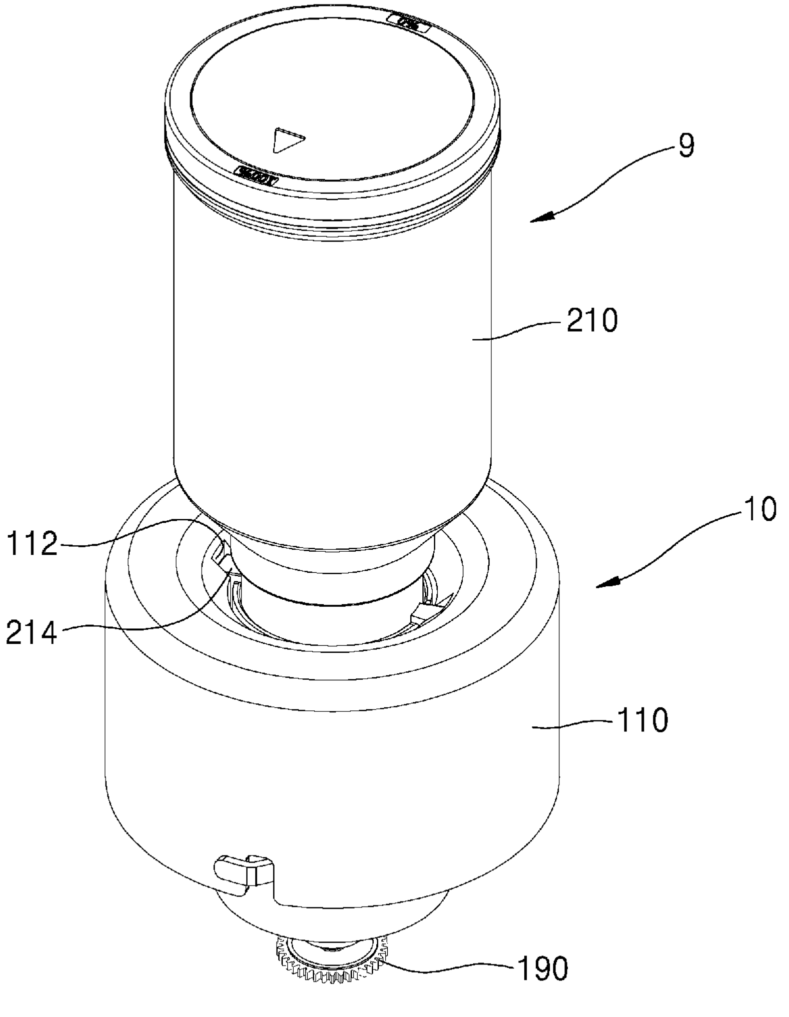
Figure 12C:
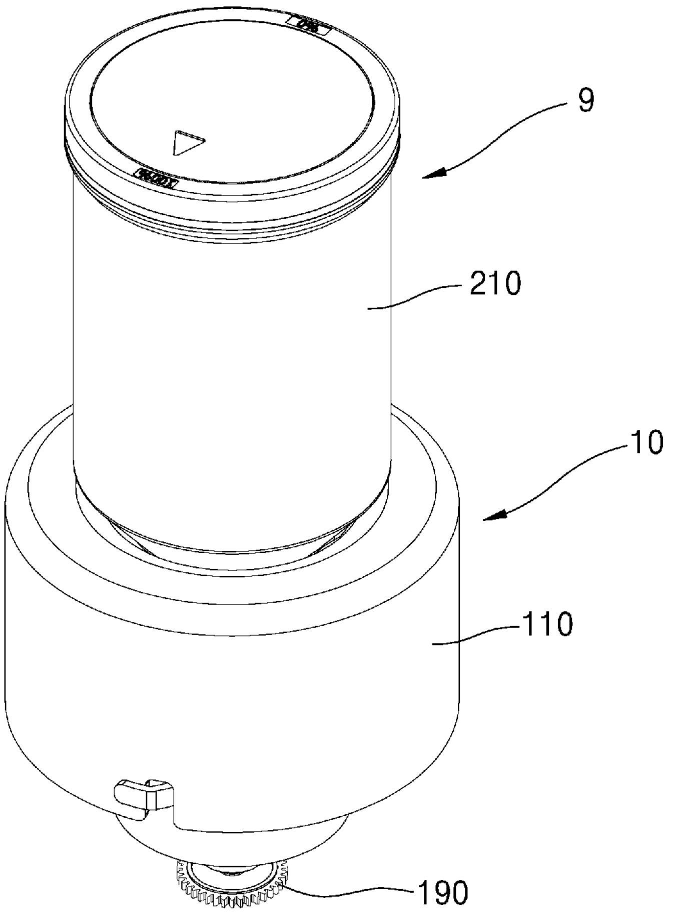
Figure 13A:
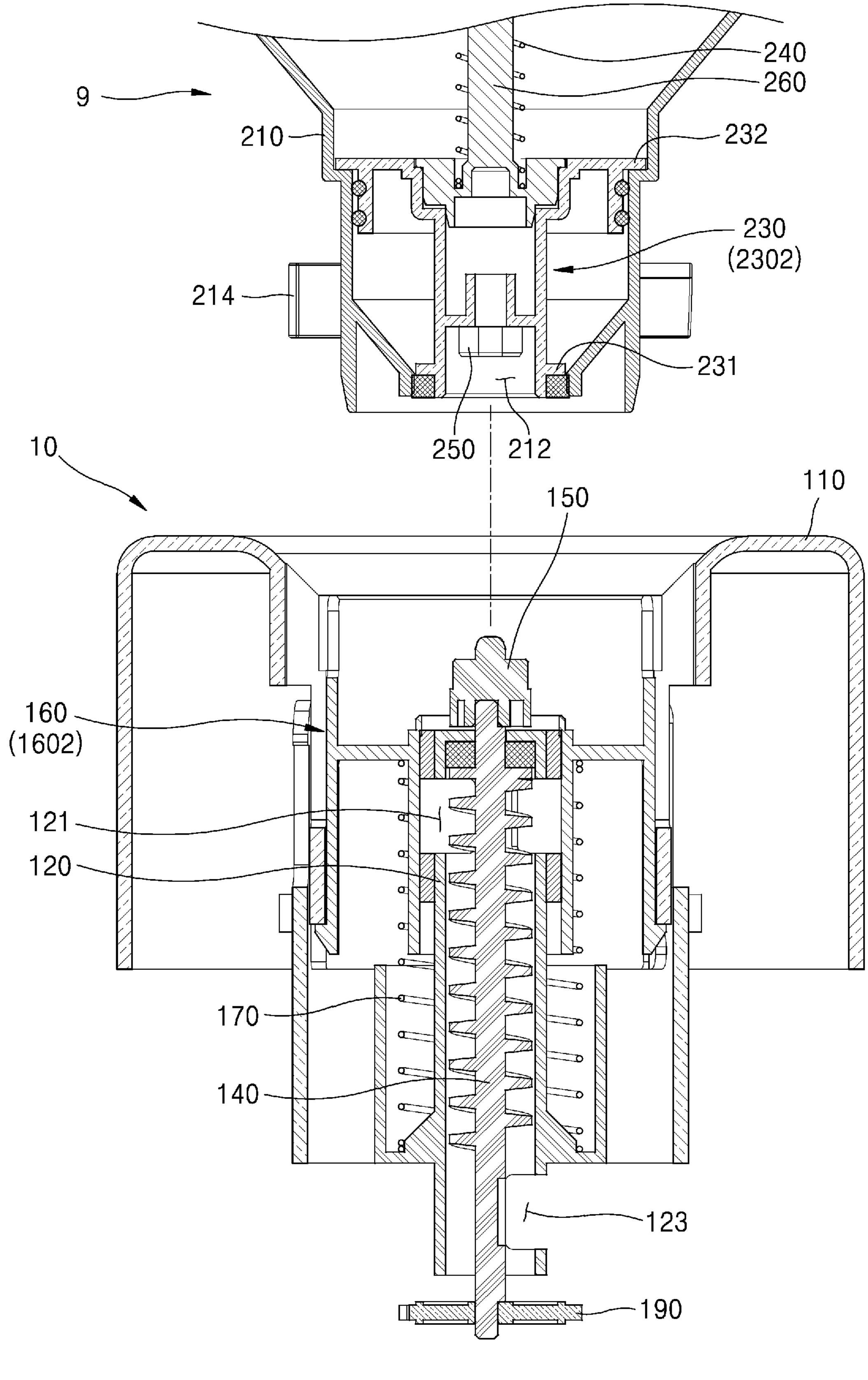
FIGS. 13A to 13C are cross-sectional views illustrating a process in which the toner refilling cartridge of FIGS. 12A to 12C is installed in a toner filling portion of an image forming apparatus.
Figure 13B:
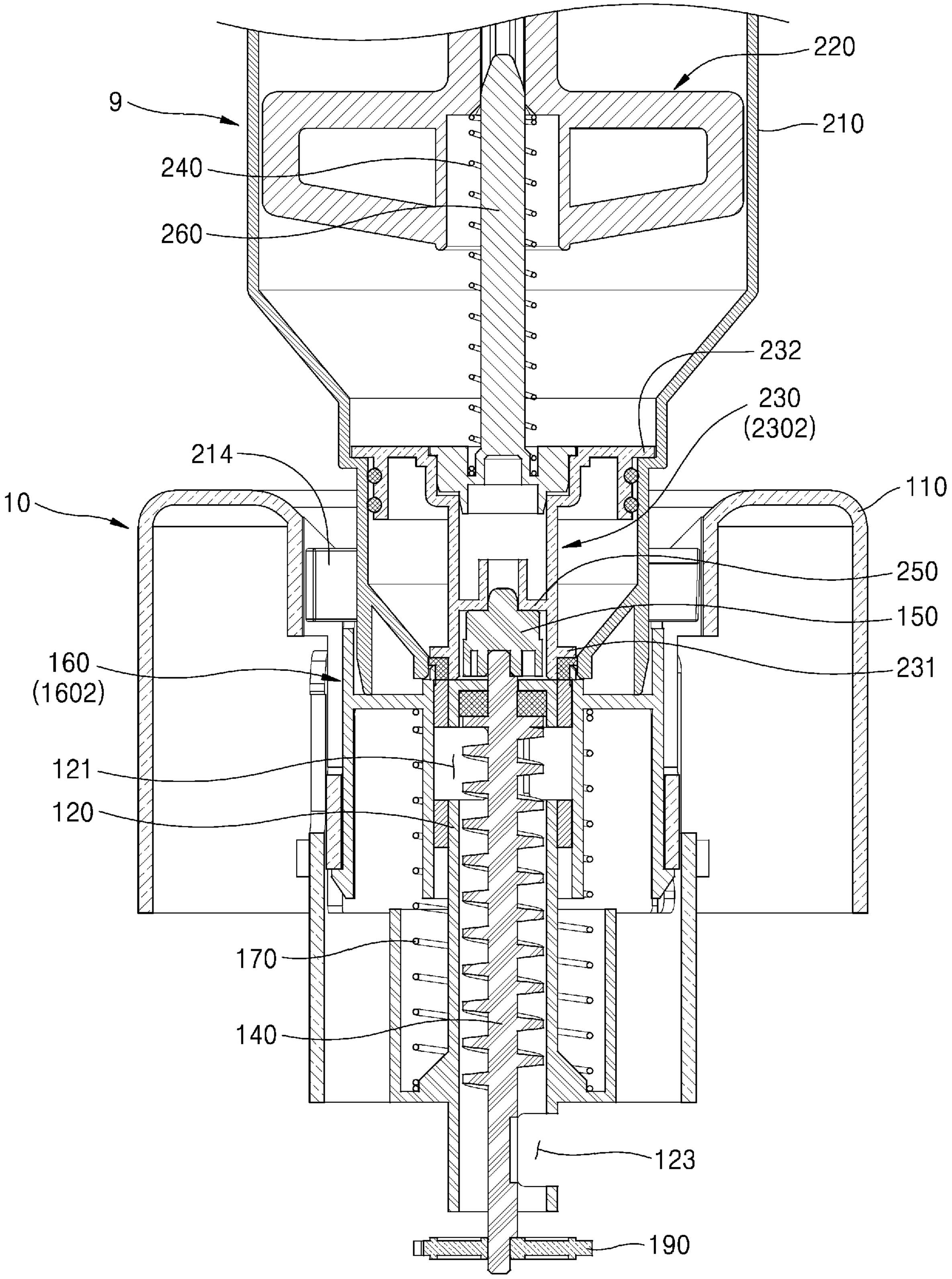
Figure 13C:
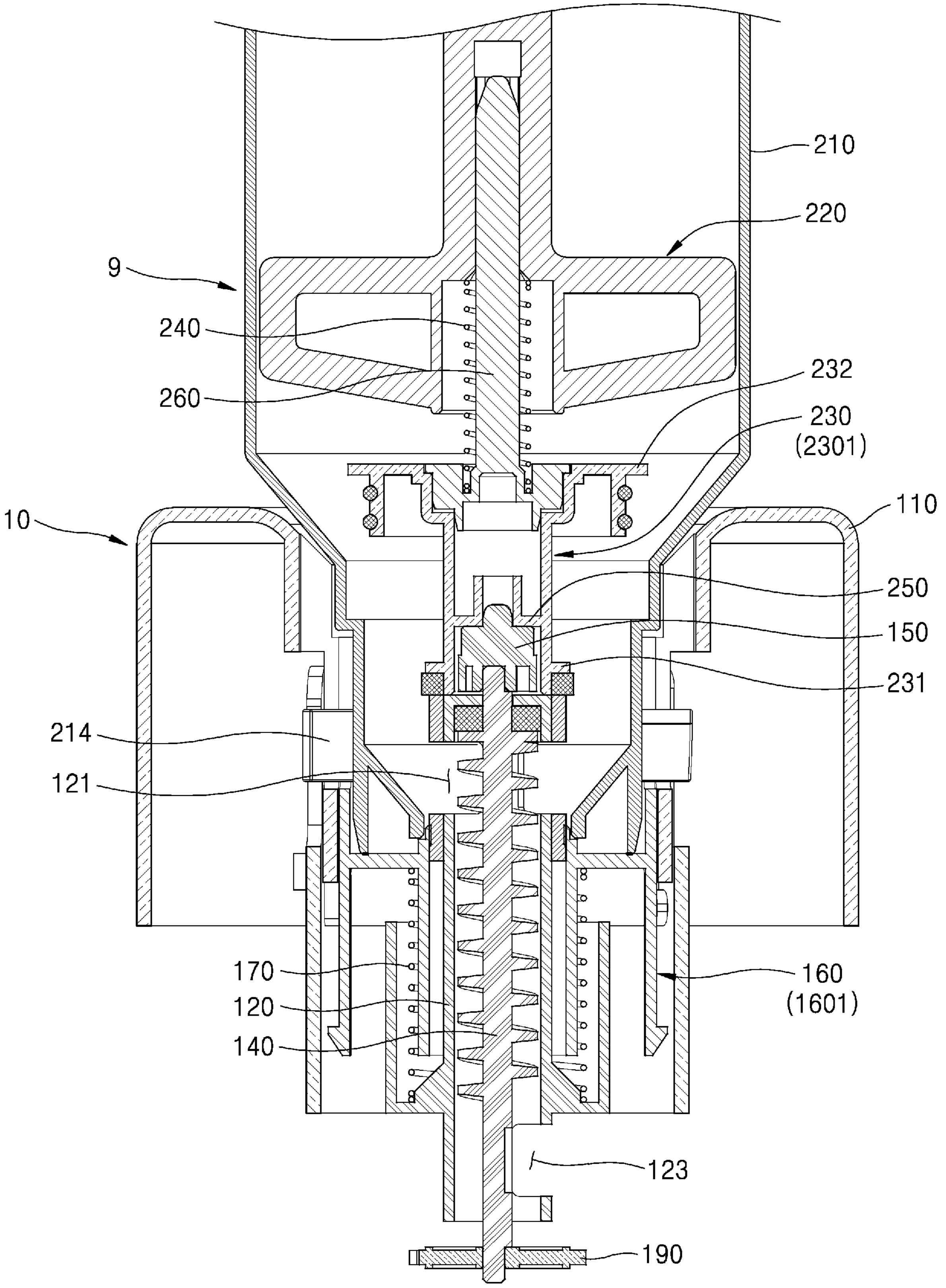
Figure 14A:
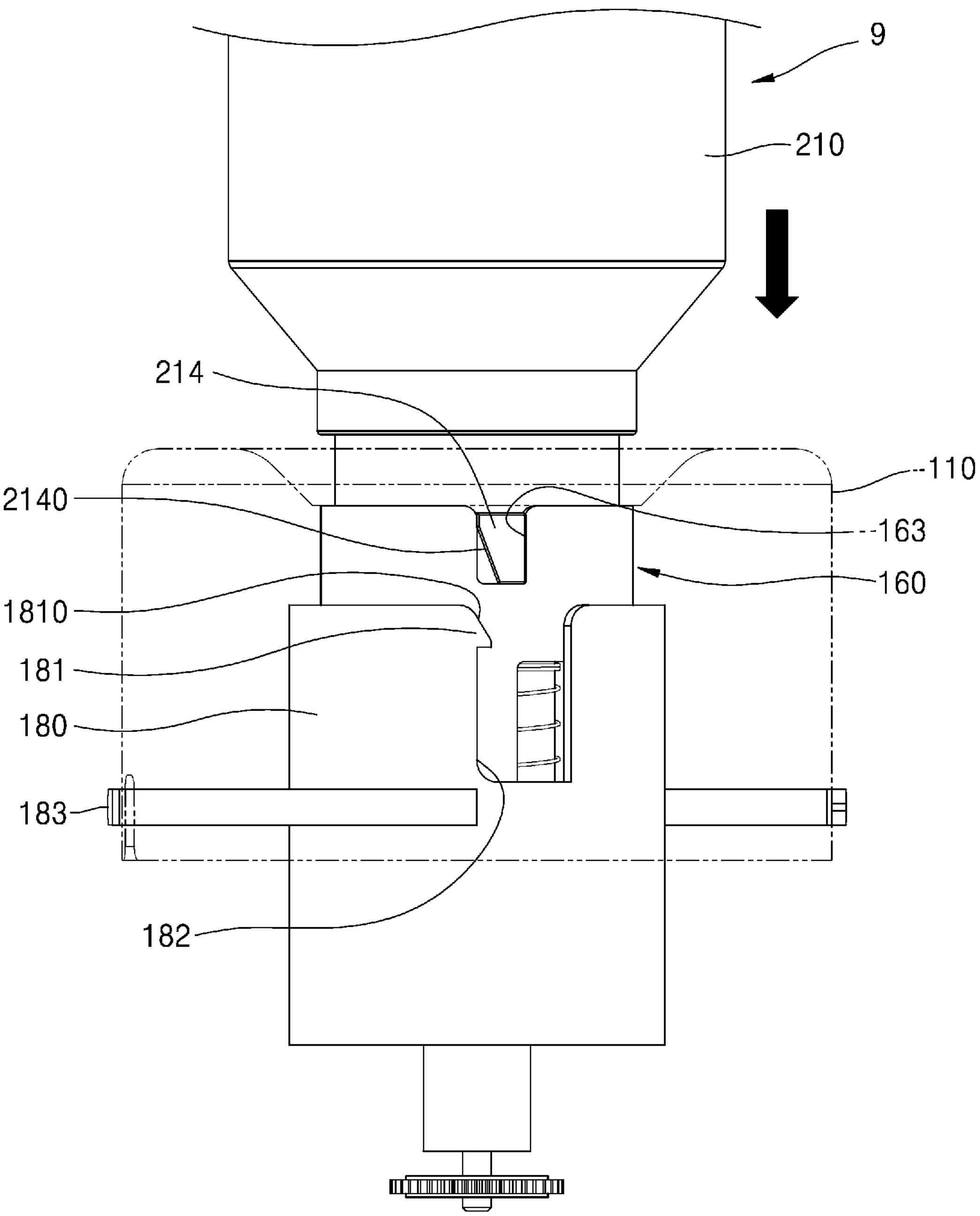
FIGS. 14A to 14C are diagrams illustrating a process in which a coupling portion is fixed by a locking portion in a case where the toner refilling cartridge of FIGS. 12A to 12C is installed in a toner filling portion of an image forming apparatus.
Figure 14B:
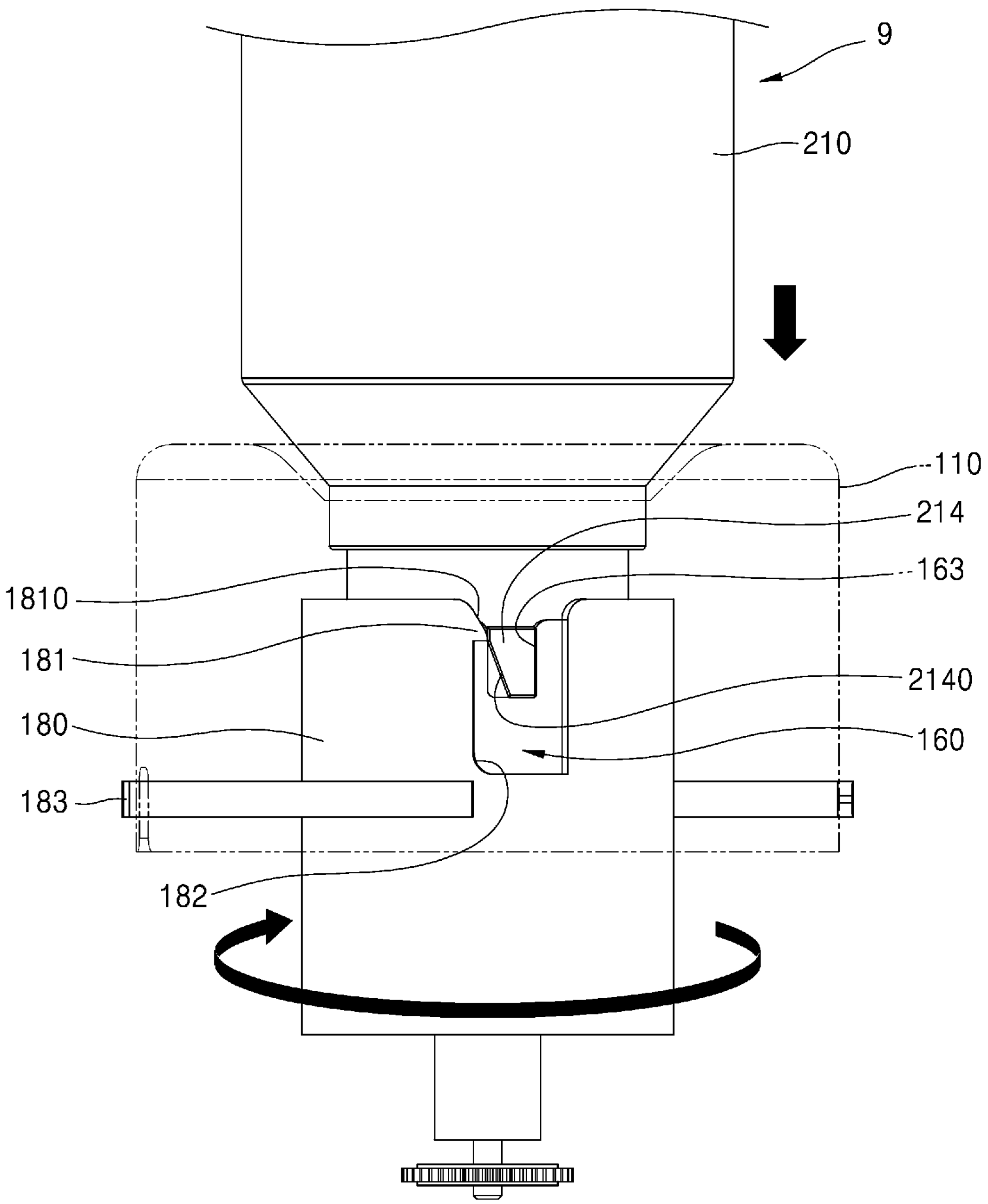
Figure 14C:
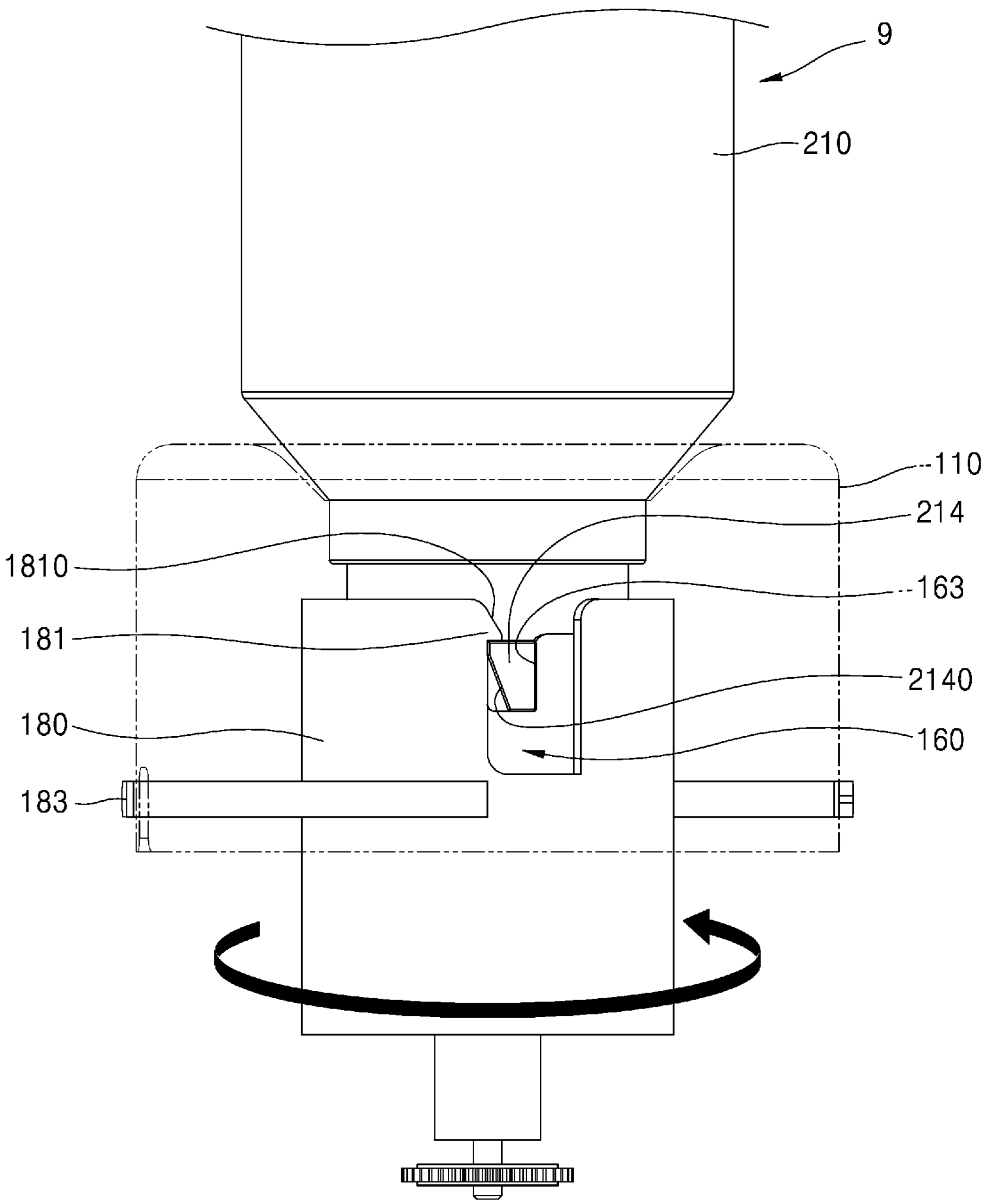
Figure 15:
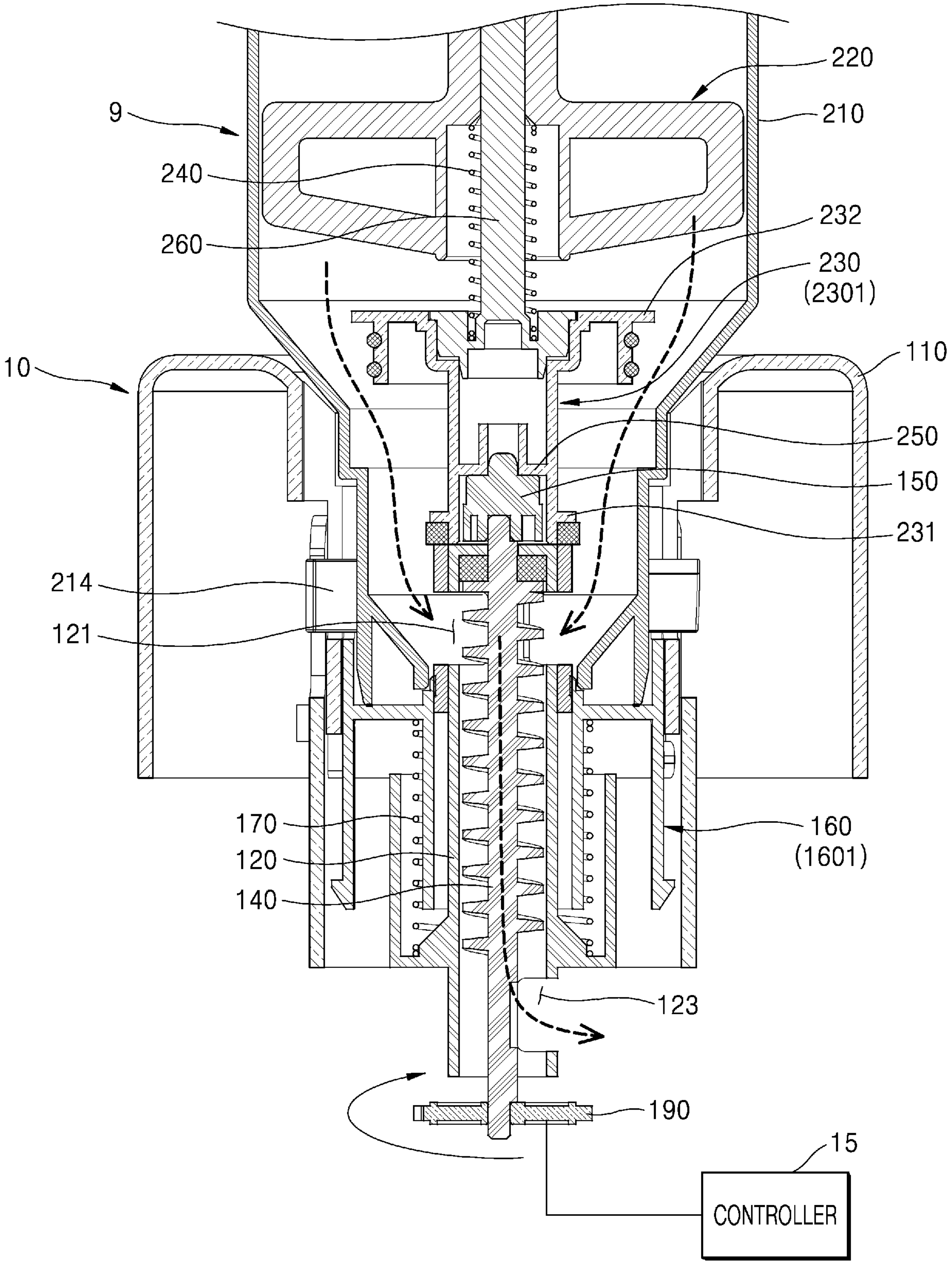
FIG. 15 is a cross-sectional view illustrating a state in which toner is supplied to an image forming apparatus from a toner refilling cartridge installed in the image forming apparatus, according to an example.

FIGS. 12A to 12C are perspective views illustrating a process in which the toner refilling cartridge 9 is installed in the toner filling portion 10 of an image forming apparatus, according to an example, and FIGS. 13A to 13C are cross-sectional views illustrating a process in which the toner refilling cartridge 9 of FIGS. 12A to 12C is installed in the toner filling portion 10 of an image forming apparatus. FIGS. 14A to 14C are diagrams illustrating a process in which the coupling portion 214 is fixed by the locking protrusion 181, when the toner refilling cartridge 9 of FIGS. 12A to 12C is installed in the toner filling portion 10 of an image forming apparatus. FIG. 15 is a cross-sectional view illustrating a state in which toner is supplied to an image forming apparatus from the toner refilling cartridge 9 installed in the image forming apparatus, according to an example.

Referring to FIGS. 12A and 13A, first, the toner refilling cartridge 9 filled with toner is prepared. The shutter member 230 of the toner refilling cartridge 9 is in the blocked position 2302, and accordingly, because of the first shutter 231 and the second shutter 232, the toner contained in the toner refilling cartridge 9 does not leak out. In the arrangement of FIGS. 12A and 13A, the second shutter member 160 of the toner filling portion 10 is located at the second blocked position 1602, and the toner inlet 121 of the toner conveying tube 120 is blocked by the second shutter member 160. While the second shutter member 160 is movable in the direction of gravity, the remaining components of the toner filling portion 10, apart from the second shutter member 160, for example, the driving force transmitter 150, the toner conveying tube 120, etc. do not move in the direction of gravity. A user inserts the toner refilling cartridge 9 into the toner filling portion 10 in the direction of gravity such that the toner outlet 212 faces the insertion hole 111 of the toner filling portion 10.

Referring to FIGS. 12B and 13B, when the toner refilling cartridge 9 is inserted into the insertion hole 111 of the filling cover 110, the coupling portion 214 of the toner refilling cartridge 9 is inserted into a positioning groove 112 provided in the filling cover 110. While the coupling portion 214 is inserted into the positioning groove 112, the driving force receiver 250 of the toner refilling cartridge 9 comes into contact with the driving force transmitter 150 of the image forming apparatus, and the body 210 of the toner refilling cartridge 9 comes into contact with the second shutter member 160 of the image forming apparatus. In a state in which the driving force receiver 250 and the body 210 of the toner refilling cartridge 9 are in contact with the driving force transmitter 150 and the second shutter member 160 of the image forming apparatus, the toner refilling cartridge 9 is pressed in the direction of gravity.

Referring to FIGS. 12C and 13C, the body 210 of the toner refilling cartridge 9 moves in the direction of gravity due to the user's applied pressure. In that case, the driving force receiver 250 in contact with the driving force transmitter 150 and the shutter member 230 on which the driving force receiver 250 is arranged do not move in the direction of gravity. Accordingly, the shutter member 230 moves relative to the body 210 in a direction opposite to the direction of gravity. The shutter member 230 relatively moves from the blocked position 2302 to the open position 2301, and the pressing member 240 between the shutter member 230 and the agitating member 220 is compressed. As the shutter member 230 moves to the open position 2301, the toner may be conveyed between the toner outlet 212 and the first shutter 231, and the toner may also be conveyed between an inner circumferential surface of the body 210 and the second shutter 232. Accordingly, the toner contained in the accommodation space 2101 is movable in the direction of gravity.

As the body 210 of the toner refilling cartridge 9 moves in the gravity direction, the second shutter member 160 contacted and pressed by the body 210 moves in the gravity direction from the second blocked position 1602 to the second open position 1601. As the second shutter member 160 moves to the second open position 1601, the toner inlet 121 of the toner conveying tube 120 is opened, and the second pressing member 170 is compressed. Accordingly, the toner moving between the inner circumferential surface of the body 210 and the second shutter 232 may flow into the toner inlet 121 of the toner conveying tube 120.

An example of a process of fixing a location of the body 210 of the toner refilling cartridge 9 while installing the toner refilling cartridge 9 in the toner filling portion 10 is described below.

Referring to FIGS. 14A and 14B, while the toner refilling cartridge 9 is inserted into the insertion hole 111 of the filling cover 110, the coupling portion 214 on the outer circumferential surface of the body 210 of the toner refilling cartridge 9 moves in the direction of gravity. While the coupling portion 214 of the body 210 moves in the direction of gravity, the coupling portion 214 may be inserted into the first groove 163 of the second shutter member 160 and the second groove 182 of the fixing portion 180. While the coupling portion 214 is inserted into the second groove 182, an inclined surface 2140 of the coupling portion 214 contacts and presses the inclined surface 1810 of the locking protrusion 181. At least a portion of a pressing force in the direction of gravity of the coupling portion 214 is converted into a pressing force in a direction perpendicular to the direction of gravity by the inclined surface 2140 of the coupling portion 214 and the inclined surface 1810 of the locking protrusion 181. Accordingly, the locking protrusion 181 moves in the direction perpendicular to the direction of gravity, for example, in a left direction. In that case, the fixing portion 180 on which the locking protrusion 181 is formed rotates, and a shape of the fixing blade 183 of the fixing portion 180 is temporarily modified.

Referring to FIG. 14C, when the coupling portion 214 moves lower than the locking protrusion 181 while the coupling portion 214 moves in the direction of gravity, a force applied to locking protrusion 181 by the coupling portion 214 is released. When the force applied to the locking protrusion 181 is released, the fixing portion 180 rotates in an opposite direction due to shape resilience of the fixing blade 183, and the locking protrusion 181 also moves in the right direction to return to its original location. Therefore, the locking protrusion 181 is located above the coupling portion 214 to restrict movement of the coupling portion 214 upward. Thus, the location of the body 210 of the toner refilling cartridge 9 may be fixed, and the toner refilling cartridge 9 may be prevented from falling out of the toner filling portion 10 inadvertently.

Hereinafter, while the toner refilling cartridge 9 is installed, a process in which toner is refilled into the toner filling portion 10 by the toner refilling cartridge 9 is described.

Referring to FIG. 15, as the user presses the toner refilling cartridge 9 until the toner filling portion 10 is completely installed, the driving force transmitter 150 of the toner filling portion 10 is coupled to the driving force receiver 250 of the toner refilling cartridge 9, and the shutter member 230 and the second shutter member 160 are located at the open position 2301 and the second open position 1601, respectively.

The controller 15 may rotate the driving force supplier 190, when the toner refilling cartridge 9 is installed in the toner filling portion 10. The controller 15 may determine whether the toner refilling cartridge 9 is installed in the image forming apparatus through a communication portion, and may rotate the driving force supplier 190 in a certain direction, in a case where it is determined that the toner refilling cartridge 9 is installed. As the controller 15 rotates the driving force supplier 190 in a certain direction, the rotation conveying portion 140 connected to the driving force supplier 190 may rotate, and the toner in the toner conveying tube 120 may be rapidly conveyed in the direction of gravity. In that case, the driving force transmitter 150 arranged at one end portion of the rotation conveying portion 140 rotates along with the rotation conveying portion 140. As the driving force transmitter 150 rotates, the driving force receiver 250 coupled to the driving force transmitter 150 rotates, and a rotational force of the driving force receiver 250 is transmitted to the agitating member 220 through the driving shaft 260 to rotate the agitating member 220. The toner stored in the accommodation space 2101 is agitated by the rotation of the agitating member 220, and the agitated toner passes between the body 210 and the first and second shutters 231 and 232 to be supplied to the toner inlet 121 of the toner conveying tube 120. The toner supplied to the toner conveying tube 120 moves in the direction of gravity due to the rotation conveying portion 140 to be delivered into a body of the image forming apparatus through the toner outlet 123.

The controller 15 may operate the driving force supplier 190 until the toner contained in the toner refilling cartridge 9 is completely discharged to the toner filling portion 10. For example, the controller 15 may control an operation of the driving force supplier 190 by taking account of a rotation time of the driving force supplier 190 or a printing medium used after the toner refilling cartridge 9 is installed.

Hereinafter, a process of removing the toner refilling cartridge 9 is described.

As an example, the toner refilling cartridge 9 may be automatically removed after toner refilling is completed. For example, the controller 15 may automatically release locking of the toner refilling cartridge 9 after toner discharge of the toner refilling cartridge 9 is completed.

Figure 16A:
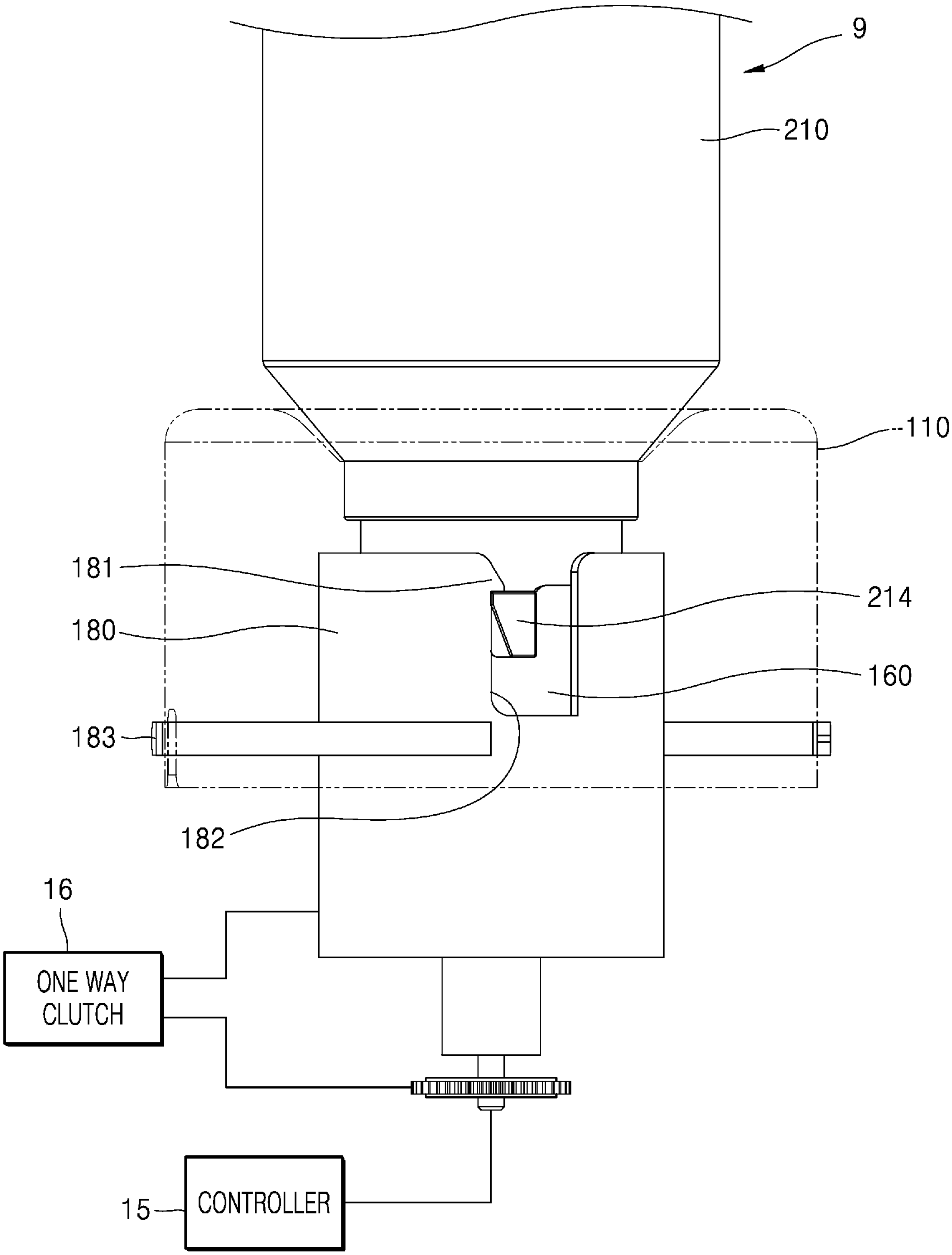
FIGS. 16A to 16C are diagrams illustrating a process in which a toner discharge cartridge is separated by a controller.
Figure 16B:
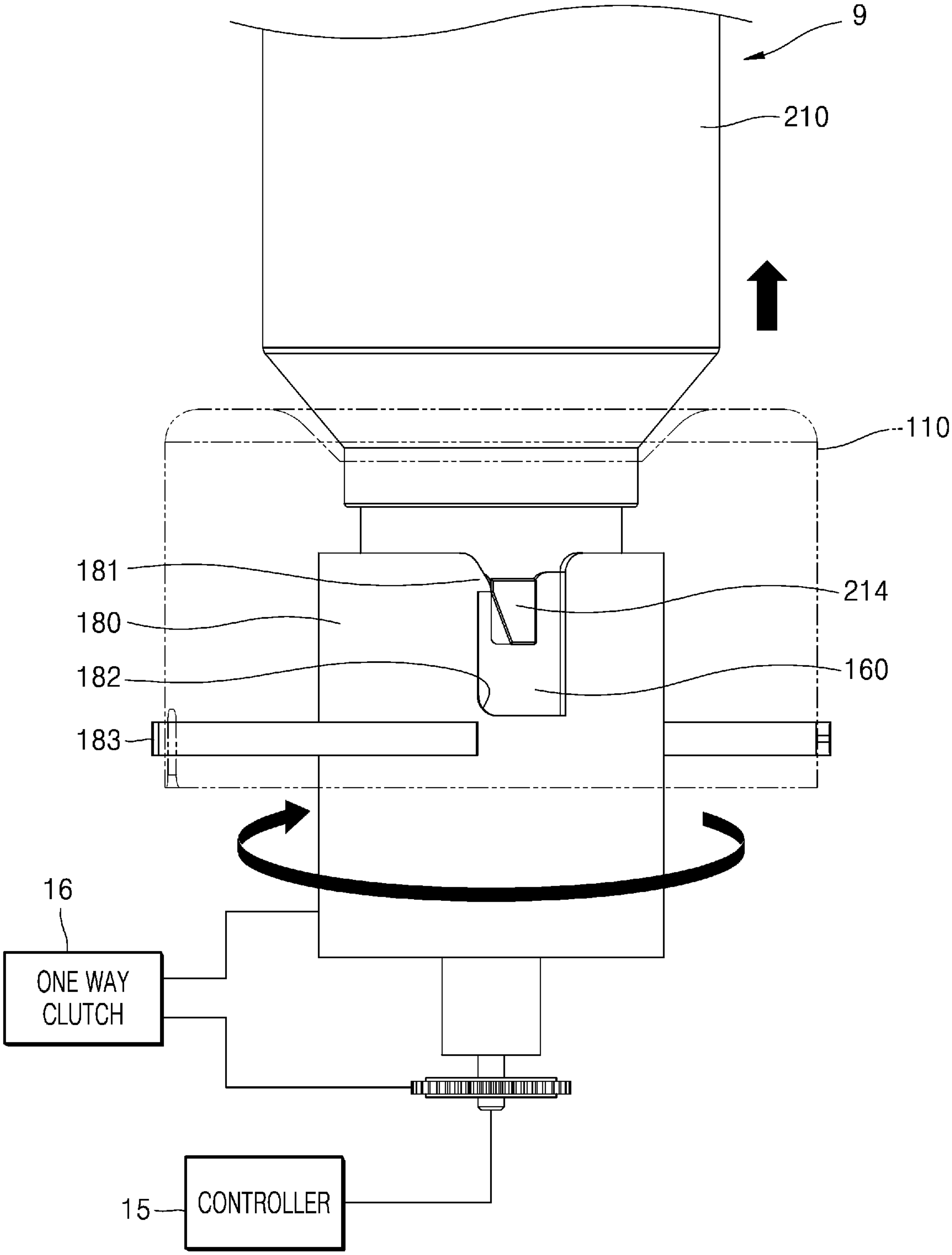
Figure 16C:
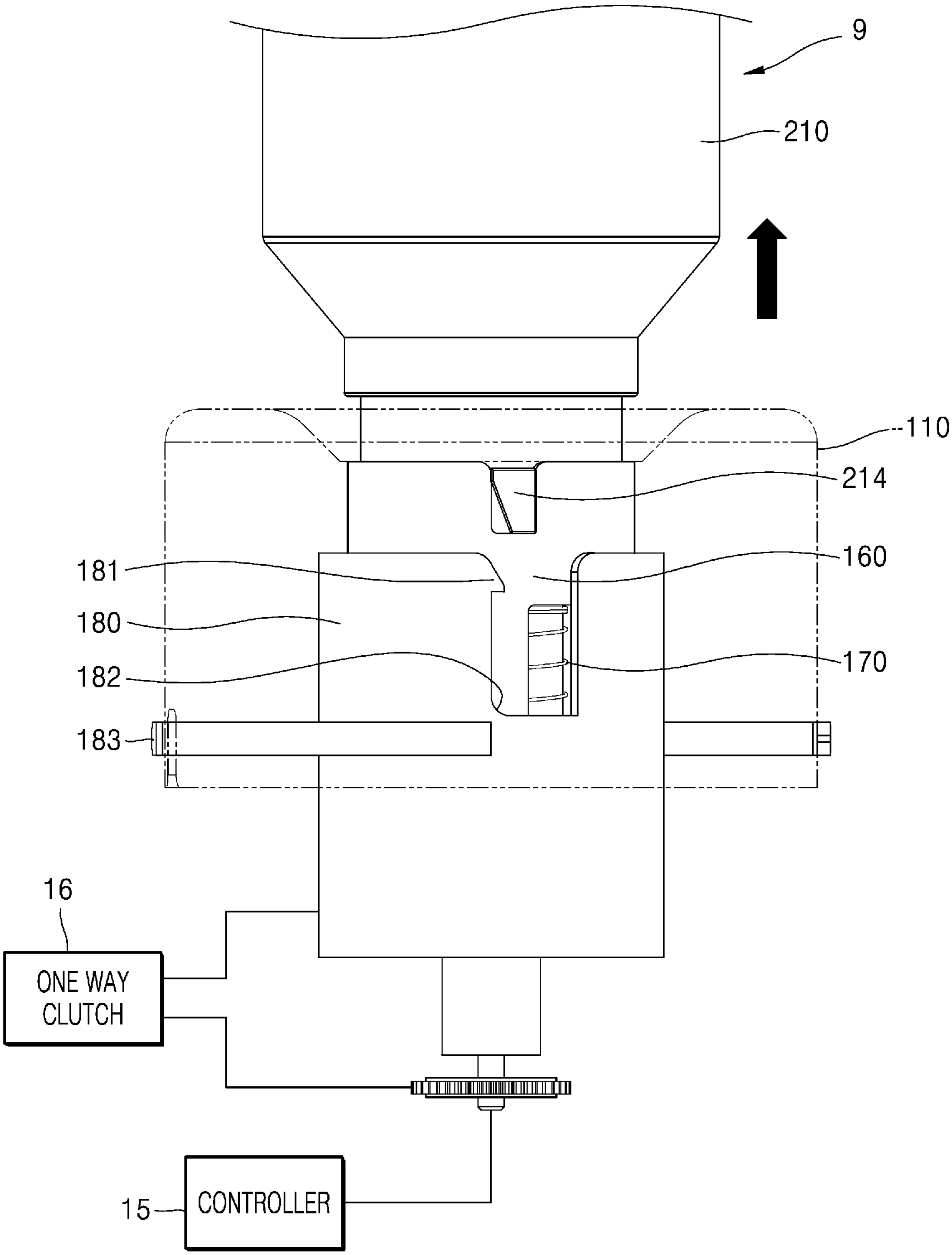

FIGS. 16A to 16C are diagrams illustrating a process in which a toner discharge cartridge is separated by the controller 15. Referring to FIG. 16A, the coupling portion 214 is locked on the locking protrusion 181 until supply of toner is completed. In that state, when the toner supply is completed, the controller 15 may change an operation direction of the driving force supplier 190. For example, the controller 15 may determine whether the toner supply is completed, by taking account of a rotation time of the driving force supplier 190 or a printing medium used after the toner refilling cartridge 9 is installed. After determining that the toner supply is completed, the controller 15 may change a rotation direction of the driving force supplier 190. For example, the controller 15 may switch the rotation direction of the driving force supplier 190 from a forward rotation in which the toner is conveyed in the direction of gravity to a reverse rotation.

A rotational force of the driving force supplier 190 may be transmitted to the fixing portion 180. For example, the forward rotation of the driving force supplier 190 may not be transmitted to the fixing portion 180, and the reverse rotation of the driving force supplier 190 may be transmitted to the fixing portion 180. As an example, the driving force supplier 190 may be connected to the fixing portion 180 by a one-way clutch 16. The one-way clutch 16 does not transmit power to the fixing portion 180, when the driving force supplier 190 rotates in a forward direction, and transmits power to the fixing portion 180, when the driving force supplier 190 rotates in a reverse direction.

Referring to FIG. 16B, the controller 15 rotates the driving force supplier 190 in the reverse direction. By the one-way clutch 16, the reverse rotational force of the driving force supplier 190 is transmitted to the fixing portion 180, thereby rotating the fixing portion 180 clockwise. Therefore, the locking protrusion 181 on the fixing portion 180 moves in a left direction. As the locking protrusion 181 moves, the coupling portion 214 may move upward.

Referring to FIGS. 13C and 16C, the second shutter member 160 is pressed upward by the second pressing member 170. Therefore, as the locking protrusion 181 moves in the left direction, locking of the coupling portion 214 is released, and the second shutter member 160 is pressed by the second pressing member 170 so as to rise in a direction opposite to the direction of gravity. The body 210 of the toner refilling cartridge 9 that contacts the second shutter member 160 rises. Accordingly, the toner refilling cartridge 9 moves more upward than in a case where the toner filling portion 10 is completely installed, and is detachable from the toner filling portion 10. A user may recognize that toner refilling has been completed by the toner refilling cartridge 9, by checking that the toner refilling cartridge 9 has moved upward.

According to the above-described example, the toner refilling cartridge 9 is automatically switched to a detachable state by the controller 15. In other examples, the toner refilling cartridge 9 may be manually removed by the user's force. For example, although not shown, the user may turn the body 210 of the toner refilling cartridge 9 to separate the coupling portion 214 of the toner refilling cartridge 9 from the locking protrusion 181.

According to the above-described examples, the shutter member 230 and the driving force receiver 250 are a single body in the toner refilling cartridge 9. However, in other examples, the shutter member 230 and the driving force receiver 250 may be modified into various structures.

Figure 17:
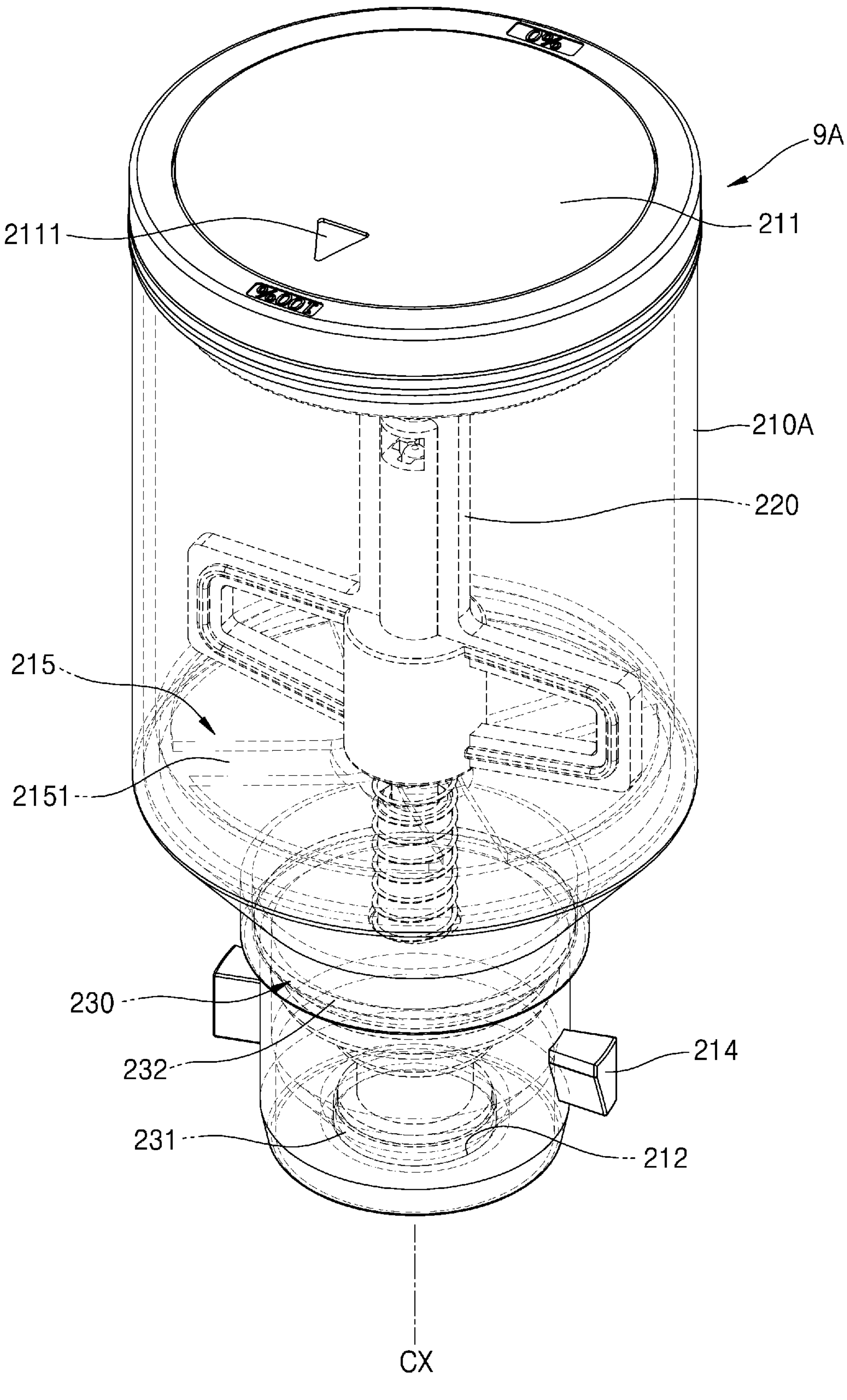
FIG. 17 is a perspective view of a toner refilling cartridge, according to another example.
Figure 18:
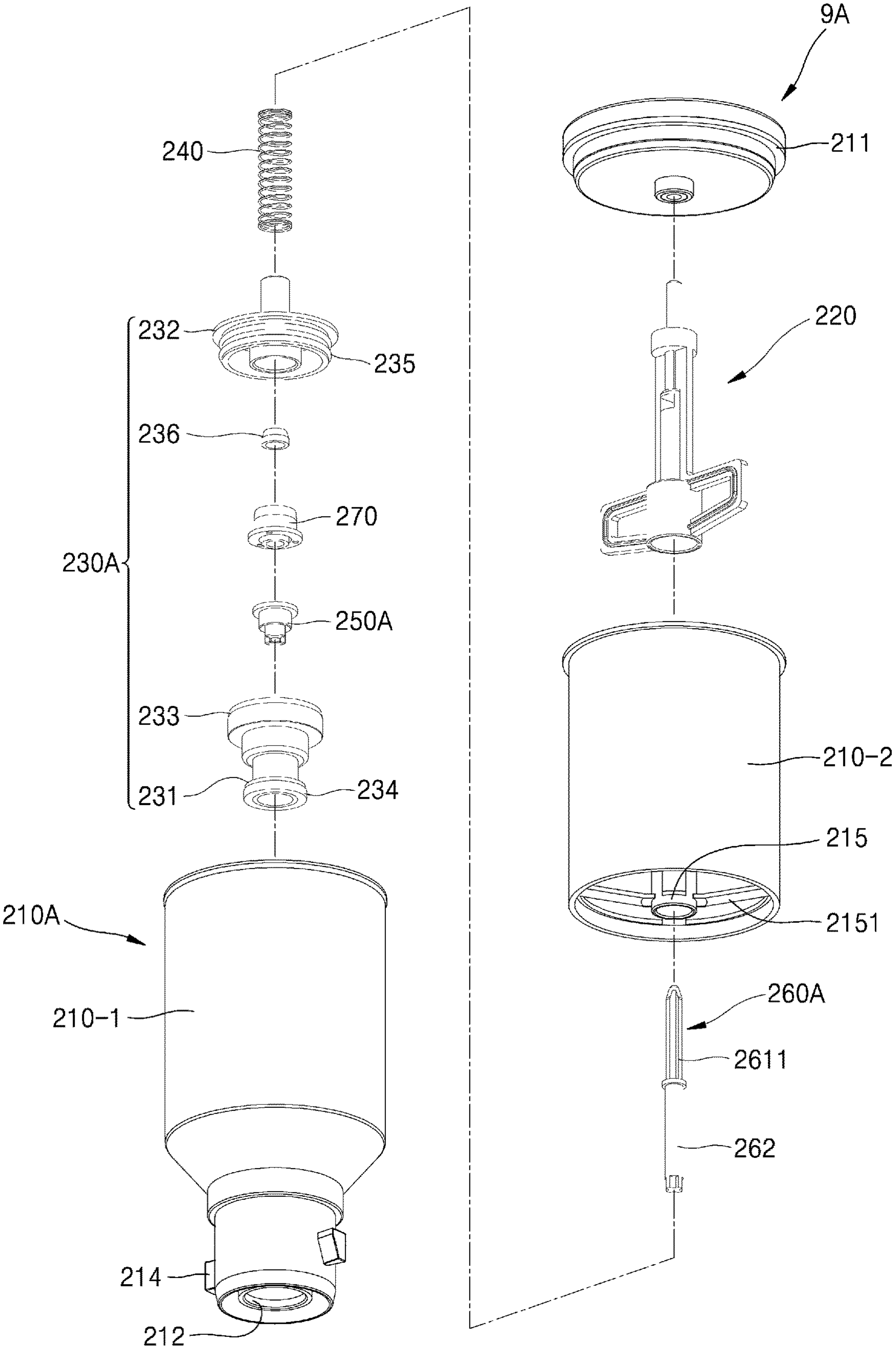
FIG. 18 is an exploded perspective view of the toner refilling cartridge of FIG. 17, according to an example.
Figure 19:
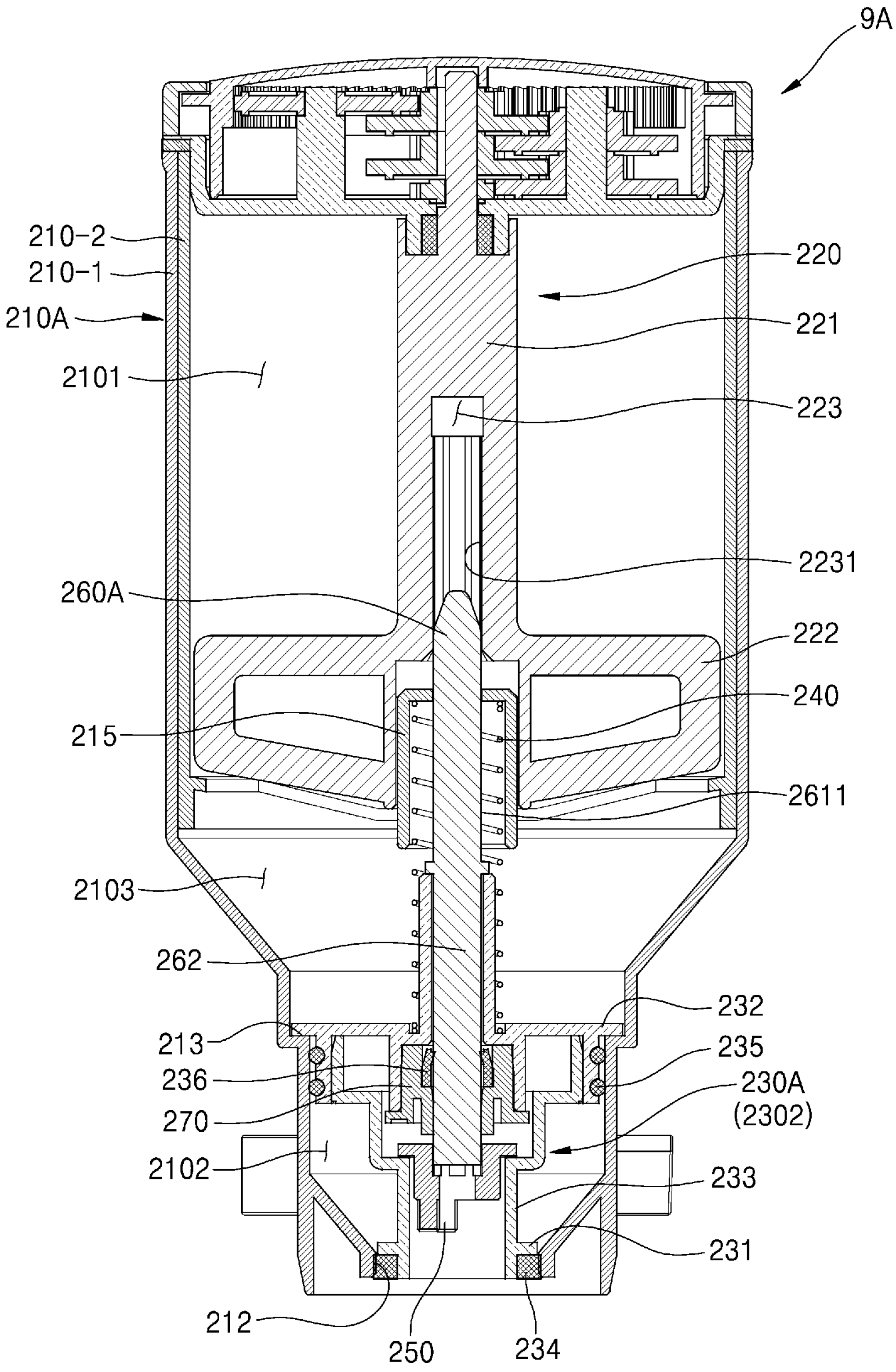
FIGS. 19 and 20 are diagrams illustrating an operation of the toner refilling cartridge of FIG. 17.
Figure 20:
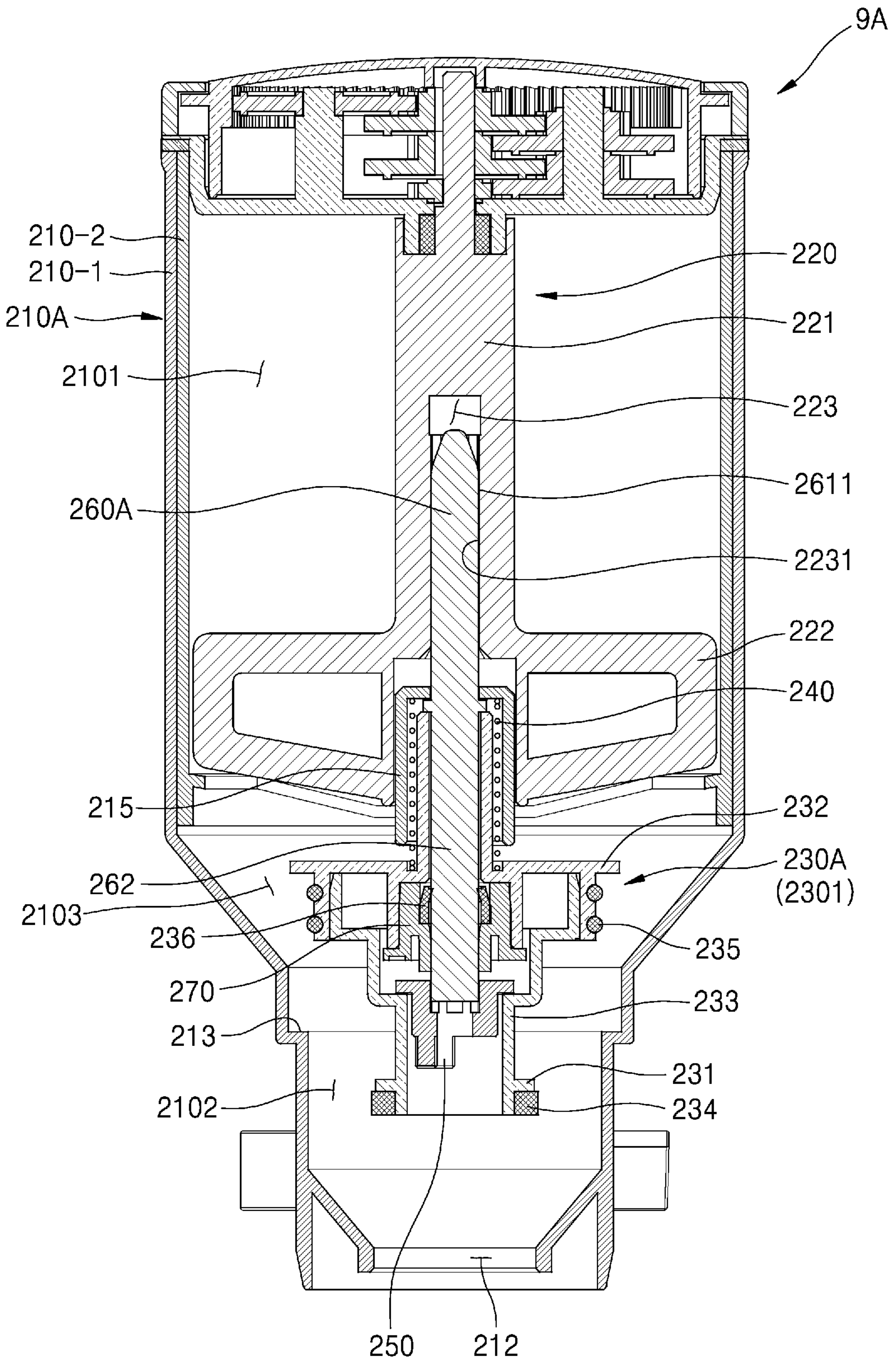

FIG. 17 is a perspective view of a toner refilling cartridge 9A, according to another example, FIG. 18 is an exploded perspective view of the toner refilling cartridge 9A of FIG. 17, according to an example, and FIGS. 19 and 20 are diagrams illustrating an operation of the toner refilling cartridge 9A of FIG. 17.

Referring to FIGS. 17 to 20, the toner refilling cartridge 9A according to further examples includes a body 210A, the agitating member 220, a shutter member 230A, the pressing member 240, a driving force receiver 250A, and a driving shaft 260A. Hereinafter, descriptions of the same configuration as in the above-described example are omitted, and only differences are described.

The body 210A supports one end portion of the pressing member 240, and may further include a support portion 215 through which the driving shaft 260A passes. For example, the body 210A may include a first body portion 210-1 and a second body portion 210-2, where the coupling portion 214 and the toner outlet 212 are formed in the first body portion 210-1, and the support portion 215 is formed in the second body portion 210-2, which is arranged inside the first body portion 210-1. The support portion 215 may be fixed onto the second body portion 210-2 by a plurality of arms 2151. The driving shaft 260A passes through the support portion 215 to be connected to the agitating member 220.

The driving shaft 260A has one end portion connected to the agitating member 220 and another end portion fixed to the driving force receiver 250A. The driving force receiver 250A is arranged inside the shutter member 230A and supported by the shutter member 230A to be rotatable. Between the driving force receiver 250A and the shutter member 230A is included a rotation support portion 270, which supports the driving force receiver 250A to be rotatable with respect to the shutter member 230A. A third sealing member 236 may be arranged between the driving shaft 260A and the driving force receiver 250A. The shutter member 230A may be fitted with the first shutter 231 and the second shutter 232, and the driving force receiver 250A, the rotation support portion 270, and the third sealing member 236 are arranged therebetween.

One end portion of the pressing member 240 is supported by the support portion 215 and another end portion of the pressing member 240 is supported by the shutter member 230A. Since the pressing member 240 is supported by the support portion 215, instead of the agitating member 220, a pressing force of the pressing member 240 may be prevented from acting on the agitating member 220.

If the pressing force of the pressing member 240 acts on the agitating member 220, the agitating member 220 may be pressed upward, and accordingly, a frictional force due to rotation may increase between the agitating member 220 and the lid 211. In that case, a driving force to rotate the agitating member 220 may increase, and in severe cases, noise due to friction may occur when the agitating member 220 rotates.

However, in the toner refilling cartridge 9A according to the present example, since another end portion of the pressing member 240 is supported by the support portion 215, instead of the agitating member 220, the pressing force of the pressing member 240 does not act on the agitating member 220. Therefore, an increase in driving force to rotate the agitating member 220 may be prevented, and noise of the agitating member 220 may be prevented.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A toner refilling cartridge for installation in an image forming apparatus in a direction of gravity to refill toner, the toner refilling cartridge comprising:

- a body to contain toner, and comprising a toner outlet to discharge the toner to an outside of the toner refilling cartridge;
- an agitating member to rotate about a central axis of the body and agitate the toner in the body;
- a shutter member to move along the central axis with respect to the body, the shutter member comprising an open position to open the toner outlet and a blocked position to block the toner outlet;
- a driving force receiver exposed to the outside through the toner outlet when the shutter member is in the blocked position, the driving force receiver to rotate by receiving a driving force from the outside; and
- a driving shaft to transmit a rotational force of the driving force receiver to the agitating member,
- wherein the driving shaft is to move in a direction of the central axis to connect with the agitating member, while the shutter member moves from the blocked position to the open position.

2. The toner refilling cartridge of claim 1, wherein the driving force receiver is arranged inside the shutter member.

3. The toner refilling cartridge of claim 1, wherein, while the toner refilling cartridge is installed in the image forming apparatus, the driving force receiver moves relative to the body in the direction of the central axis, and the shutter member moves relative to the body from the blocked position to the open position.

4. The toner refilling cartridge of claim 1, wherein the driving shaft is movable in the direction of the central axis with respect to the agitating member, and

- when the shutter member moves from the blocked position to the open position, the driving shaft moves in the direction of the central axis, and a depth at which the driving shaft is inserted into the agitating member varies.

5. The toner refilling cartridge of claim 1, comprising a pressing member to press the shutter member such that the shutter member moves from the open position to the blocked position in the direction of the central axis.

6. The toner refilling cartridge of claim 5, wherein the pressing member is an elastic member to surround a circumference of the driving shaft, and is compressible and expandable in the direction of the central axis.

7. The toner refilling cartridge of claim 5, wherein one end portion of the pressing member is supported by the agitating member.

8. The toner refilling cartridge of claim 5, wherein the body comprises a support portion to support the one end portion of the pressing member, and the driving shaft passes through the support portion.

9. The toner refilling cartridge of claim 8, wherein the driving force receiver is fixed to the driving shaft and is supported by the shutter member to be rotatable.

10. The toner refilling cartridge of claim 1, wherein the body comprises

- an accommodation space and a discharge space, wherein the accommodation space contains the toner and the agitating member is rotatable in the accommodation space, and the toner outlet is formed in the discharge space and a width of the discharge space is less than a width of the accommodation space, and
- wherein the shutter member comprises:
  - a first shutter to block the toner outlet,
  - a second shutter to block a space between the accommodation space and the discharge space, or an inside of the discharge space,
  - a first sealing member arranged around the first shutter, and
  - a second sealing member arranged around the second shutter.

11. The toner refilling cartridge of claim 1, comprising a plurality of coupling portions provided on an outer circumferential surface of the body.

12. An image forming apparatus comprising a toner filling portion in which the toner refilling cartridge according to claim 1 is installed in the direction of gravity, the image forming apparatus comprising:

- the toner filling portion comprising
  - a filling cover to provide an insertion hole into which the toner refilling cartridge is inserted;
  - a toner conveying tube having a portion arranged in the insertion hole, extending in the direction of gravity, the toner conveying tube to provide a conveying path through which the toner is conveyed, and the toner conveying tube comprising a toner inlet through which the toner is introduced in a direction perpendicular to the direction of gravity;
  - a driving force transmitter arranged at one end portion of the toner conveying tube, coupled to the driving force receiver, the driving force transmitter to transmit a driving force to the driving force receiver;

a rotation conveying portion having one end portion connected to the driving force transmitter, and arranged in the toner conveying tube to be rotatable to convey the toner in the toner conveying tube in the direction of gravity; and a second shutter surrounding a circumference of the toner conveying tube, the second shutter movable in the direction of gravity and in a direction opposite to the direction of gravity, the second shutter comprising a second blocked position to block the toner inlet and a second open position to open the toner inlet.

13. The image forming apparatus of claim 12, comprising a driving force supplier to supply a driving force to the rotation conveying portion such that the rotation conveying portion rotates, wherein, while the driving force supplier rotates, the driving force of the driving force supplier is transmitted to the driving force transmitter through the rotation conveying portion, and the driving force transmitted to the driving force transmitter rotates the agitating member through the driving force receiver and the driving shaft of the toner refilling cartridge.

14. The image forming apparatus of claim 13, comprising a controller to rotate the driving force supplier when the toner refilling cartridge is installed in the toner filling portion.

15. The image forming apparatus of claim 12, comprising a fixing portion to fix a location of the body of the toner refilling cartridge.

* * * * *